US008583909B2

(12) United States Patent
Cha et al.

(10) Patent No.: US 8,583,909 B2
(45) Date of Patent: Nov. 12, 2013

(54) DIGITAL BROADCAST RECEIVER AND BOOTING METHOD OF DIGITAL BROADCAST RECEIVER

(75) Inventors: Sang Hoon Cha, Seocho-gu Seoul (KR); Bong Seok Kim, Seocho-gu Seoul (KR); Chan Gyun Jeong, Seocho-gu Seoul (KR); In Moon Kim, Seocho-gu Seoul (KR)

(73) Assignee: LG Electronics Inc., Seoul (KR)

( * ) Notice: Subject to any disclaimer, the term of this patent is extended or adjusted under 35 U.S.C. 154(b) by 375 days.

(21) Appl. No.: 12/961,145

(22) Filed: Dec. 6, 2010

(65) Prior Publication Data

US 2011/0138164 A1 Jun. 9, 2011

Related U.S. Application Data

(60) Provisional application No. 61/266,522, filed on Dec. 4, 2009, provisional application No. 61/290,893, filed on Dec. 30, 2009.

(51) Int. Cl.

*G06F 15/177* (2006.01)
*G06F 9/24* (2006.01)
*H04L 9/32* (2006.01)
*G06F 9/44* (2006.01)

(52) U.S. Cl.

CPC ............ *G06F 9/4401* (2013.01); *G06F 9/4406* (2013.01); *H04L 9/3247* (2013.01)
USPC .................................... 713/2; 713/1; 713/176

(58) Field of Classification Search

None
See application file for complete search history.

(56) References Cited

U.S. PATENT DOCUMENTS 5,448,045 A * 9/1995 Clark ................................ 713/2
5,737,340 A * 4/1998 Tamarapalli et al. ......... 714/733
6,571,335 B1 * 5/2003 O'Donnell et al. ........... 713/173
7,174,457 B1 * 2/2007 England et al. ............... 713/168
8,135,723 B2 * 3/2012 Vaid et al. ..................... 709/217
2002/0157010 A1 * 10/2002 Dayan et al. .................. 713/191
2003/0115471 A1 * 6/2003 Skeba .......................... 713/180
2003/0217193 A1 * 11/2003 Thurston et al. .............. 709/321
2003/0237028 A1 * 12/2003 Mantyla .......................... 714/38
2004/0162472 A1 * 8/2004 Berson et al. ................. 600/323
2005/0091496 A1 * 4/2005 Hyser .......................... 713/175
2006/0129795 A1 * 6/2006 Bulusu et al. ..................... 713/2
2006/0136704 A1 * 6/2006 Arendt et al. ...................... 713/2
2007/0076130 A1 * 4/2007 Fukushima .................. 348/730
2007/0283405 A1 * 12/2007 Cha .............................. 725/118

(Continued)

FOREIGN PATENT DOCUMENTS

KR 10-2009-0093708 A 9/2009
KR 10-2011-0058448 A 6/2011

*Primary Examiner* — Andrew L Nalven
*Assistant Examiner* — Walter Malinowski
(74) *Attorney, Agent, or Firm* — McKenna Long & Aldridge LLP

(57) ABSTRACT

A digital broadcast receiver and a booting method of the digital broadcast receiver are disclosed herein. A method of secure booting of a system in a digital broadcast receiver comprises aligning a plurality of interleaved portions to generate a digital signature, respectively, with an entire firmware image, generating a digital signature of each interleaved portion, selecting a specific interleaved portion, generating a first message digest to read a region of the selected interleaved portion in the entire firmware image and a second message digest from the digital signature of the selected interleaved portion and verifying the firmware image based on the first and second message digest and booting the system in the digital broadcast receiver.

20 Claims, 17 Drawing Sheets

(56) References Cited

U.S. PATENT DOCUMENTS

2008/0098418 A1 4/2008 Dabrowa et al.
2008/0133922 A1* 6/2008 Williams .................... 713/176
2008/0137848 A1* 6/2008 Kocher et al. ................ 380/201
2008/0222368 A1* 9/2008 Gehrmann ................... 711/152
2009/0052662 A1* 2/2009 Oxford .......................... 380/43
2009/0249331 A1* 10/2009 Davis et al. ...................... 718/1
2009/0271581 A1* 10/2009 Hinrichs, Jr. ................. 345/156
2010/0161633 A1* 6/2010 Nochimowski et al. ...... 707/758
2011/0022566 A1* 1/2011 Beaverson et al. .......... 707/639

* cited by examiner

HOST
Antenna
Cable
Network Modem
100
First Broadband Interface Unit
102
Second Broadband Interface Unit
104
IP Physical Interface Unit
114
Demodulator (VSB/QAM)
106
IP to TS Decapsulator
118
Multiplexer
108
Routing Engine
116
Demultiplexer
110
Controller
122
DCAS
124
Decoder
112
DVR Controller
126
Contents Encryptor
128
Storage Interface
130
Storage Unit
132
CPU
INB
OOB
120
Security CARD

DIGITAL BROADCAST RECEIVER AND BOOTING METHOD OF DIGITAL BROADCAST RECEIVER

This application claims the benefit of U.S. Provisional Application No. 61/266,522, filed on Dec. 4, 2009, which is hereby incorporated by reference as if fully set forth herein. Also, this application further claims the benefit of U.S. Provisional Application No. 61/290,893, filed on Dec. 30, 2009, which is hereby incorporated by reference as if fully set forth herein.

BACKGROUND OF THE INVENTION

1. Field of the Invention

The present invention relates to a digital broadcast receiver and a booting method of the digital broadcast receiver and, most particularly, to a digital broadcast receiver and a booting method of the digital broadcast receiver that can perform fast booting while ensuring maximum system security.

2. Discussion of the Related Art

With the remarkable evolution in the digital technology, digitalization is being accelerated not only in general households but also throughout the entire industry. However, such evolution in digital technology has brought about a wide range of advantages as well as disadvantages (or side effects). For example, hacking may correspond to one of the main side effects. Unlike in the analog era, due to the unlimited provision of time and space in the digital era, the number of hacking attempts is increasing, and such attempts are causing a considerable amount of damage and loss. With the recent introduction and increasing supply of smart phones and smart TVs, hacking attempts are becoming more frequent and constant in the industrial work fields as well as general households or personal digital devices.

When the power of a digital device is turned on, a booting process of the device is executed. The booting process also includes a system security checking process, which verifies whether or not a security breach (or compromise) or hacking attempt has occurred in the corresponding digital device. The major issues in the recent digital devices include the above-described security issue and also the issue on how to reduce the booting time.

In conclusion, digital devices require to be ensured with minimized booting time as well as maximum security. However, there are limitations in resolving such problems and satisfying the associated requirements by simply enhancing the performance of a CPU (Central Processing Unit) included in the digital devices. Furthermore, if either one of the security issue and the booting issue is reinforced and enhanced, there is a problem of having to abandon the improvement of the other issue.

SUMMARY OF THE INVENTION

Accordingly, the present invention is directed to provide a digital broadcast receiver and a booting method of the digital broadcast receiver that substantially obviate one or more problems due to limitations and disadvantages of the related art.

Another object of the present invention is to provide a method and device that can reduce a booting time while ensuring system security.

A further object of the present invention is to provide a method and device that can enhance the efficiency of the overall system while maintaining backward compatibility with the conventional system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an embodiment of the present invention, a method of secure booting of a system in a digital broadcast receiver comprises aligning a plurality of interleaved portions to generate a digital signature, respectively, with an entire firmware image; generating a digital signature of each interleaved portion; selecting a specific interleaved portion; generating a first message digest to read a region of the selected interleaved portion in the entire firmware image and a second message digest from the digital signature of the selected interleaved portion; and verifying the firmware image based on the first and second message digest and booting the system in the digital broadcast receiver.

According to another embodiment of the present invention, a method of secure booting of a system in a digital broadcast receiver comprises dividing into a header part, a body part and a tailor part in an entire firmware image based on a file system, wherein the body part is aligned a plurality of interleaved portions to generate a digital signature, respectively, and the header and tailor part as a whole area includes all interleaved portions of the body part; generating a digital signature of each interleaved portion; selecting a specific interleaved portion; generating a first message digest to read any one of the header and tailor part in the entire firmware image and a second message digest from the digital signature of the selected interleaved portion; and verifying the firmware image based on the first and second message digest and booting the system in the digital broadcast receiver.

According to yet another embodiment of the present invention, a digital broadcast receiver of secure booting of a system comprises a controller configured to control to align a plurality of interleaved portions to generate a digital signature, respectively, with an entire firmware image, and generate a digital signature of each interleaved portion, the controller further configured to control to select a specific interleaved portion, generate a first message digest to read one or more regions of the selected interleaved portion in the entire firmware image and a second message digest from the digital signature of the selected interleaved portion, and verify the firmware image based on the first and second message digest and boot the system in the digital broadcast receiver.

According to a further embodiment of the present invention, a digital broadcast receiver of secure booting of a system comprises a controller configured to control to divide into a header part, a body part and a tailor part in an entire firmware image based on a file system, wherein the body part is aligned a plurality of interleaved portions to generate a digital signature, respectively, and the header and tailor part as a whole area includes all interleaved portions of the body part, and generate a digital signature of each interleaved portion, the controller further configured to select a specific interleaved portion, generate a first message digest to read any one of the header and tailor part in the entire firmware image and a second message digest from the digital signature of the selected interleaved portion, and verify the firmware image based on the first and second message digest and boot the system in the digital broadcast receiver.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, various embodiments of the present invention will be described in detail with reference to the accompanying drawings.

The present invention relates to a digital broadcast receiver and a booting method of the digital broadcast receiver and, most particularly, to a digital broadcast receiver and a booting method of the digital broadcast receiver that can perform fast booting while ensuring maximum system security.

In the following description of the present invention, in order to facilitate and simplify the understanding of the present invention, a secure booting method will be given as an example of the booting method. Additionally, a digital television receiver that can process digital television signals being transmitted through diverse media will be given as an example of the digital broadcast receiver. However, the present invention will not be limited only to the above-mentioned examples. And, therefore, examples of the digital broadcast receiver according to the present invention may include all types of system that can perform secure booting, including embedded systems, such as smart phones, satellite Direct TVs, smart TVs, IPTVs, set-top boxes providing VOD services, and so on. It is to be understood that the scope and spirit of the present invention will not be limited only to the embodiments of the present invention that will be described in detail hereinafter. It will also be apparent that the principles for resolving the problems of the present invention may be applied to all applicable fields by using the same or similar methods introduced herein.

In the following description of the present invention, 'secure boot' or 'secure booting' will be used, not as the booting process applied in the related art embedded system, but as a collective term of a booting process for realizing fast booting while ensuring maximum system security according to each of the following embodiments of the present invention.

Digital Broadcast Receiver

Figure 1:
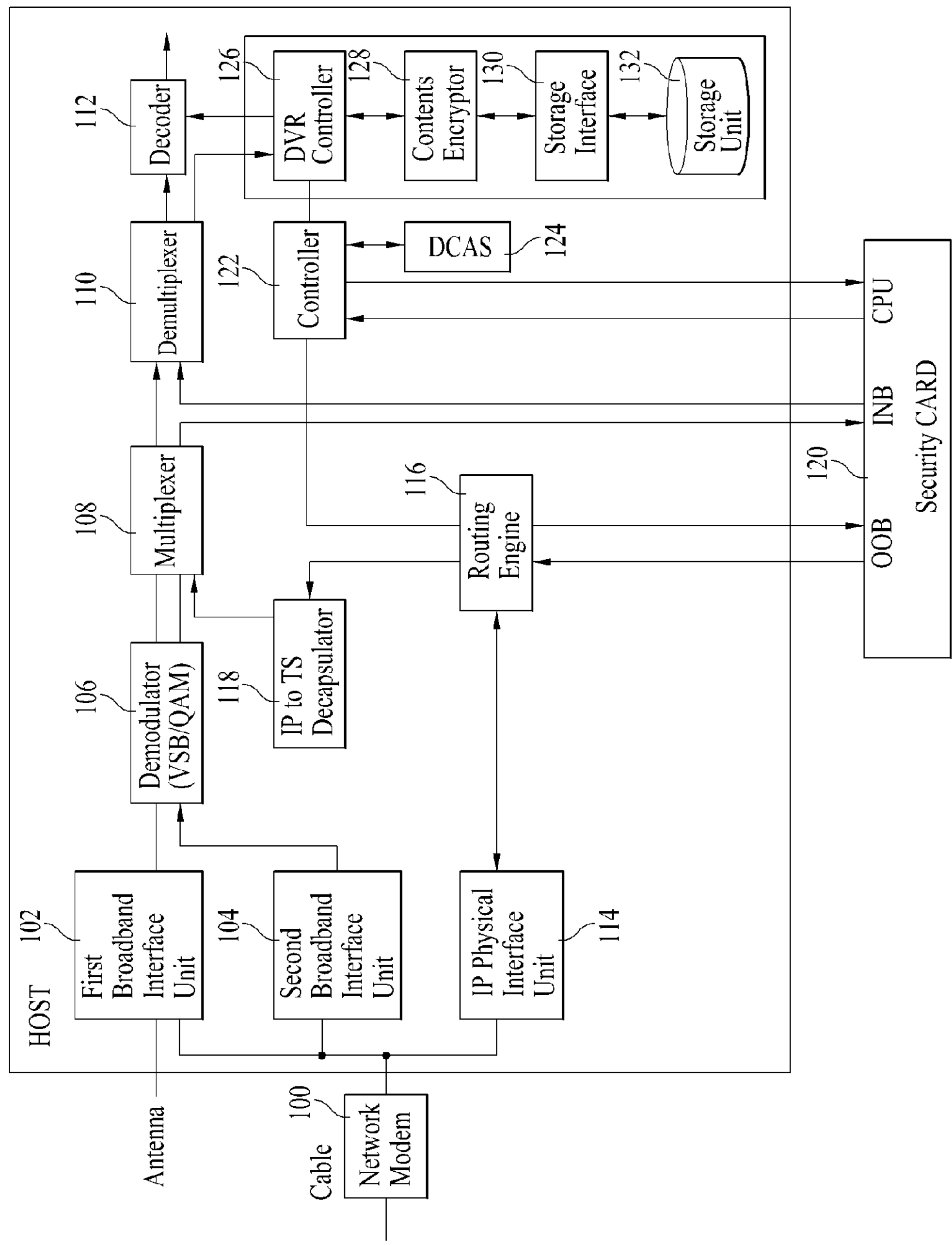
FIG. 1 illustrates a block view showing an exemplary structure of a digital television receiver according to the present invention.

FIG. 1 illustrates a block view showing an exemplary structure of a digital television receiver according to the present invention.

FIG. 1 illustrates a digital television receiver as an example of a system, wherein the secure booting method according to the following embodiments of the present invention can be applied.

After performing security check and booting of the system by using the secure booting method according to any one of the embodiments of the present invention, the digital television receiver according to the present invention receives a digital television signal and an IP packet including the digital television signal through an antenna and a cable and, then, processes the received digital television signal and IP packet. Also, as a means for protecting the transmitted contents, the digital television receiver may adopt Conditional Access, Content Protection, and so on. In order to do so, the digital television receiver may use a CableCARD, a DCAS (Downloadable Conditional Access System), and so on, as examples of Conditional Access, Content Protection, and so on. The usage of the CableCARD or the DCAS is an option that can be selected by the service provider that provides the requested services. And, in case the CableCARD or the DCAS is used in the receiver, the service provider communicating with the receiver should also use the same system.

Hereinafter, each element configuring the digital television receiver will be described in detail. Since the secure booting method will be described in a later process, a detailed description of the same will be omitted in this portion of the description.

FIG. 1 illustrates a digital television receiver configured to receiver IP-based IPTV services, cable broadcasting, terrestrial (or groundwave) broadcasting, satellite broadcasting, and so on. However, depending upon the embodiment of the receiver shown in FIG. 1, the digital television receiver may receive and process only IPTV services or receive and process cable broadcasting. Furthermore, depending upon the embodiment of the digital broadcast receiver, each element of FIG. 1 may be referred to by using different terms.

The receiver of FIG. 1 broadly consists of a host and a CableCARD. The host includes a network modem 100, a first broadband interface unit 102, a second broadband interface unit 104, a demodulator 106, a multiplexer 108, a demultiplexer 110, a decoder 112, an ethernet NIC (Network Interface Card) (an IP physical interface unit) 114, a TCP/IP network unit (routing engine) 116, a IP to TS decapsulator 118, a controller 122, a DCAS (Downloadable CAS) unit 124, a DVR (Digital Video Recorder) controller 126, a content encryption unit 128, a storage interface unit 130, and a storage unit 132. The CableCARD 120 may correspond to a Single stream card that can process only one stream or may correspond to a Multistream card that can process multiple streams at the same time.

The receiver corresponds to an open-cable type, wherein a CableCARD including the Conditional Access (CA) system is detached (or separated) from the main body. The CableCARD is also referred to as a POD (Point Of Deployment) module. And, herein, the CableCARD is detachably fixed to a main body slot of the receiver. Additionally, the main body in which the CableCARD is inserted is referred to as a host. In other words, the CableCARD and the host are collectively referred to as the receiver. A network connector 140 performs the role of connecting an external network with a receiver. For example, the network connector 140 may connect an external IP network with the receiver. For example, when a MoCA (Multimedia Over Coax Alliance) is used, an IP-based network may be built within a coaxial cable network so as to perform connection. Alternatively, connection may be made with an external network by using a DOCSIS modem, or connection may be made with an external network by using a wireless (or radio) relay station, which performs connection with a wireless Internet network, or by using a wired relay station, such as wired ADSL relay station, which performs connection with a wired Internet network. However, the connection with the external network is merely exemplary. And, therefore, the type of network connector may vary occur depending upon the method of connection with the external network.

The first broadband interface unit 102 tunes only a specific channel frequency among groundwave (or terrestrial) A/V (Audio/Video) broadcast signals, which are transmitted through an antenna, or cable A/V broadcast signals, which are transmitted via in-band through a cable connected to the network connector 100. Then, the first broadband interface unit 102 outputs the tuned signal to the demodulator 106.

At this point, since the transmission method of groundwave broadcasting is different from the transmission method of cable broadcasting, the demodulation method performed by the demodulator 106 may also vary accordingly. For example, groundwave A/V broadcasting is modulated by VSB (Vestigial Sideband) Modulation and then transmitted, and cable broadcasting is modulated by QAM (Quadrature Amplitude Modulation) and then transmitted. Therefore, if the channel frequency tuned by the first broadband interface unit 102 corresponds to groundwave broadcasting, the demodulator 106 performs demodulation using the VSB method. And, if the channel frequency tuned by the first broadband interface unit 102 corresponds to cable broadcasting, the demodulator 106 performs demodulation using the QAM method.

The second broadband interface unit 104 tunes only a specific frequency among cable A/V broadcast signals, which are transmitted via in-band through a cable connected to the network connector 100 and, then, outputs the tuned signal to the demodulator 106.

The first broadband interface unit 102 and the second broadband interface unit 104 may be used for tuning signals of different channels, thereby transmitting the tuned signals to the demodulator 106. Alternatively, the second broadband interface unit 104 may tune a different A/V stream of the same channel as that of the first broadband interface unit 102, thereby transmitting the tuned stream (or signal) to the demodulator 106. For example, the first broadband interface unit 102 may tune a stream of a main picture, and the second broadband interface unit 104 may tune a stream of a PIP (Picture in Picture). And, in case of storing a digital image (or video) signal by using a DVR (Digital Video Recorder), image (or video) signals may be stored (or recorded) while viewing (or watching) an image (i.e., watch & record) by using the first broadband interface unit 102 and the second broadband interface unit 104.

The demodulator 106 demodulates the received signal and transmits the demodulated signal to the multiplexer 108. The multiplexer 108 may perform multiplexing on the signals inputted to the demodulator 106 and a IP to TS Decapsulator 118 and then output the multiplexed signals. For example, a main image, which is tuned by the first broadband interface unit 102 and demodulated, may be multiplexed with a PIP image, which is tuned by the second broadband interface unit 104 and demodulated, thereby being outputted. Furthermore, depending upon the embodiment of the present invention, images of different channels may be multiplexed and outputted, or an image may be multiplexed with a signal outputted from the IP to TS decapsulator 118, thereby being outputted.

If the signal outputted from the multiplexer 108 corresponds to a groundwave broadcast signal, the inputted signal is outputted to the demultiplexer 110. And, if the signal outputted from the multiplexer 108 corresponds to a cable broadcast signal or an IPTV broadcast signal, the inputted signal is outputted to the demultiplexer 110 through a CableCARD 120 fixed in a slot. Herein, in order to prevent duplication of high value-added broadcast contents and to allow limited (or conditional) access of the high value-added broadcast contents, the CableCARD 120 includes a Conditional Access (CA) system may also be referred to as a POD (Point Of Deployment) module. More specifically, if the received broadcast signal is scrambled, the CableCARD 120 descrambles the corresponding broadcast signal and then outputs the descrambled signal to the demultiplexer 110. If the CableCARD 120 is not mounted, the A/V broadcast signal outputted from the multiplexer 108 is directly outputted to the demultiplexer 110. In this case, since the scrambled A/V broadcast signal cannot be descrambled, normal viewing of the image cannot be provided.

The demultiplexer 110 separates the inputted video signal and the inputted audio signal, thereby outputting the separated signals to the decoder 112. The decoder 112 recovers each of the A/V signals, which were respectively compressed by using a video decoding algorithm and an audio decoding algorithm, back to the initial state, thereby outputting the recovered signals for display.

The DVR (Digital Video Recorder) controller 126, the content encryption unit 128, the storage interface unit 130, and the storage unit 132 each performs the role of storing the received digital data or playing-back (or reproducing) the stored data. Depending upon the control of the controller 122, the DVR controller 126 is controlled so as to store image data (or video data) selected from the data outputted from the demultiplexer 110 or to playback (or reproduce) image data (or video data) selected from the stored data. The content encryption unit 128 either encrypts and outputs the data that are to be stored or recovers the encrypted and stored data and outputs the recovered data. Depending upon the embodiment of the present invention, the content encryption unit 128 may not be used.

The storage interface unit 130 performs an input and output interface with the storage unit 132, and the storage unit 132 stores the inputted data.

The DCAS unit 124 may download and store conditional access systems (CASs) from a server of the transmitting end. Thereafter, the DCAS unit 124 may perform conditional access functions in accordance with a most suitable conditional access system among the stored conditional access systems. The controller 122 controls the interface between the host and the CableCARD and also controls the data processing of the host.

Among the signals received through the network connector 100, the Ethernet NIC 114 receives an Ethernet frame packet being transmitted to a specific IP address and then transmits the received ethernet packet to the routing engine 116. Alternatively, the Ethernet NIC 114 may transmit data respective to two-way (or bi-directional) communication (e.g., charged program subscription, status information of the receiver, user input, and so on) from the routing engine 116 and may transmit the received data to an external network through the network connector 100. The specific address may correspond to the IP address of the host itself or the IP address of the CableCARD.

In case of the receiver shown in FIG. 1, IPTV broadcast signals respective to an IP protocol, or VOD (Video On Demand) signals, or OOB (Out Of Band) message signals may be received through the Ethernet NIC 114. In case of the conventional cable broadcasting, a DSG (DOCSIS Set-top Gateway) method or an OOB (Out Of Band) method may be used, so as to received OOB messages, such as SI (System Information), EAS (Emergency Alert System), XAIT (eXtended Application Information Table), conditional access system information, various CableCARD control information, and so on.

In case of the receiver shown in FIG. 1, a DOCSIS modem or an OOB tuner may be equipped within the host, so that the receiver can receive OOB messages. For example, one of the IP method and the OOB method may be used so as to receive the OOB messages, or one of the IP method, the DSG method, and the OOB method may be used so as to receive the OOB messages.

In case of receiving OOB messages by using one of the IP method and the OOB method, the receiver shown in FIG. 1 further requires an OOB modem, a demodulator, and so on. And, in case of receiving OOB messages by using one of the IP method, the DSG method, and the OOB method, the receiver shown in FIG. 1 further requires a DOCSIS modem, an OOB modem, a switching unit for selecting one of the DSG method and the OOB method, a demodulator for transmitting data to a head-end portion in accordance with each method, and so on.

And, as described above, in case of using all of the IP method, the conventional DSG method, and the OOB method, or in case of using the IP method and the OOB method, while excluding the DSG method, the transmitting end decides which method to use and transmits the respective information to the CableCARD.

The CableCARD notifies the operation method to the host in accordance with the information decided by the transmitting end. In this case, the problem of backward compatibility may also be resolved.

In the description of the receiver of FIG. 1, instead of the DSG method using the DOCSIS modem or the OOB method using the OOB tuner, the case of receiving OOB messages through the Ethernet NIC 114 using the IP will be mainly described for simplicity. In this case, the transmitting end should packetize the OOB messages and transmit the packetized OOB messages by using the IP. In case of VOD broadcasting or IPTV broadcasting, messages such as conditional access system information may be received in packet formats identical to the VOD packets or the IPTV packets.

However, the OOB messages are merely examples given in the description of the present invention. Therefore, depending upon the embodiment of the present invention, additionally required information other than the exemplary information mentioned above may be added. Alternatively, among the exemplary information mentioned above, unnecessary information may be excluded.

The TCP (Transmission Control Protocol)/IP (Internet Protocol) network unit 116 uses a TCP/IP-based network stack so as to route the received packet to the destination of the packet. The routing engine 116 supports both TCP/IP and UDP (User Datagram Protocol).

The routing engine 116 routes the received VOD signal or IPTV broadcast signal to the IP to TS decapsulator 118. The IP to TS decapsulator 118 parses the received MPEG (Moving Picture Expert Groups)-based TP packets and outputs the parsed TP packets to the multiplexer 108. The operation processes after the multiplexer 108 have already been described above in detail. Since it is assumed, in the above-described example, that the broadcast signal is MPEG-based, the TP packet is received and packetized. However, in case a broadcast signal using a different standard is being received, a unit other than the TP packet unit may be used. Accordingly, the spirit and scope of the present invention will not be limited only to the terms used herein according to the embodiment of the present invention.

The OOB (Out Of Band) message, which corresponds to one of the packets having the CableCARD as its destination, is routed by the routing engine 116 so as to be transmitted to the CableCARD 120. In case of routing the OOB message to the CableCARD 120, data may be transmitted to the CableCARD 120 via 2$^{nd}$ layer routing or 3$^{rd}$ layer routing. In case of using the 2$^{nd}$ layer routing, the routing process may be performed by using a MAC (Media Access Control) address system of the destination included in the header of the received Ethernet frame. The usage of the 2$^{nd}$ layer routing or the 3$^{rd}$ layer routing may vary depending upon the embodiment of the present invention. More specifically, depending upon the embodiment of the present invention, the 2$^{nd}$ layer routing may be used, or the 3$^{rd}$ layer routing may be used.

A data channel and an extended channel exist between the CableCARD and the host. The data channel is set up so as to be capable of transmitting and receiving control signals between the host and the CableCARD, and the extended channel corresponds to channel set up so as to receive and transmit actual data. The extended channel corresponds to a CPU interface defined to transmit and receive between the host and the CableCARD. More specifically, the CableCARD performs the role of interpreting a command received from the transmitting end, after communicating with the transmitting end, and performs the role of executing the details directed by the transmitting end while communication with the host through the data channel and the extended channel. Alternatively, the CableCARD performs the role of delivering details inputted by the user to the transmitting end.

At this point, in order to transmit data through the extended channel, a transmission path corresponding to the data type defined between the CableCARD and the host should first be determined. This is referred to as Flow. For example, in order to transmit MPEG section data, an MPEG section flow should first be determined between the CableCARD and the host. Thereafter, actual MPEG section data may be transmitted over the corresponding flow. The flows within the extended channel may include an IP unicast (IP_U) flow, an IP multicast (IP_M) flow, a DSG flow, a maximum of 6 MPEG section flows, and so on. However, in case an eCM (embedded Cable Modem), such as the DOCSIS modem, is not used inside the host, among the listed flows, the DSG flow is not used.

As described above, prior to setting up the communication operation mode of the host, or prior to transmitting and receiving OOB messages between the host and the CableCARD, the host should notify the network operation mode supporting information of the host to the CableCARD. Therefore, while the interface between the host and the CableCARD is being initialized, just as in the case of booting the host or having a card inserted in the host, the host transmits the network operation mode supporting information of the host to the CableCARD.

Hereinafter, a secure booting method according to diverse embodiments of the present invention that can be applied to the above-described digital television receiver will be described in detail.

According to each embodiment of the present invention, the secure booting process, i.e., a secure boot process supported by a chip 210 includes:

1) a $1^{st}$ Authentication step, wherein Authentication or Verification is performed on a Digital Signature of a Boot Loader 230 through an OTP (One-Time Password) (e.g., a Public Key), 2) a $2^{nd}$ Authentication step, wherein, once the $1^{st}$ Authentication step is passed, Authentication or Verification is performed in Boot Loader 220 on a Digital Signature of a firmware (or firmware image). This secure booting process may also be referred to as a Trusted Chain.

Herein, if failure occurs in any one of the above-described $1^{st}$ Authentication step and $2^{nd}$ Authentication step, the System Booting is interrupted. On the other hand, if both of the above-described $1^{st}$ Authentication step and $2^{nd}$ Authentication step are successful, the main functions of the system are initiated after the system booting.

Most particularly, the present invention relates to the $2^{nd}$ authentication step, which is devised to realize fast booting using a minimum booting time while ensuring maximum security of the device or system during the $2^{nd}$ authentication step.

Hereinafter, each embodiment of the present invention may be applied to a firmware 240, which is stored in a storage unit 200 of the corresponding system. The storage unit 200 may include all types of storage means, such as flash memory, HDD (Hard disk drive), and so on.

First Embodiment

Figure 2:
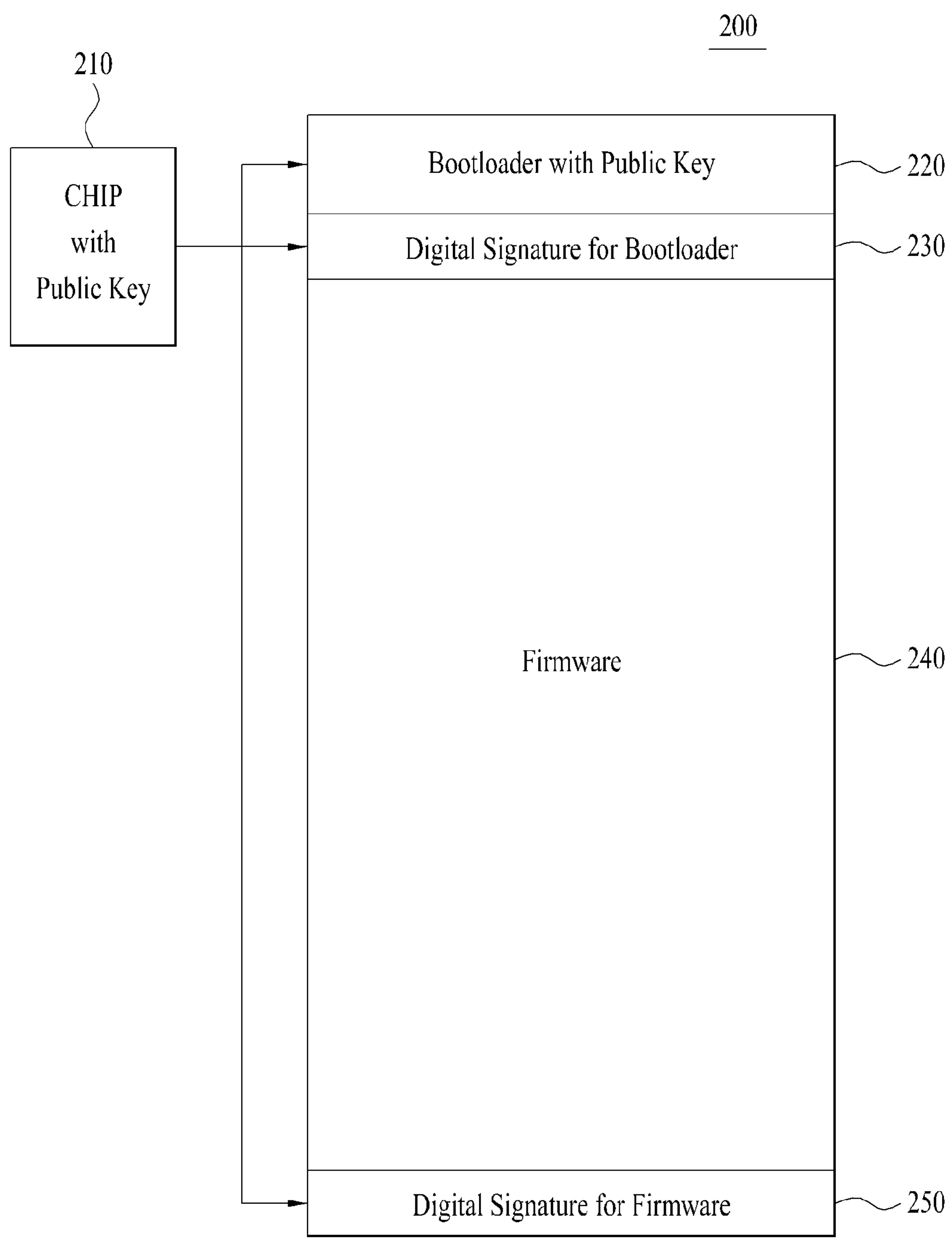
FIG. 2 illustrates a secure booting method according to a first embodiment of the present invention.

FIG. 2 illustrates a secure booting method according to a first embodiment of the present invention.

According to the first embodiment of the present invention, in order to perform secure booting, a private key is used so as to generate a single digital signature with respect to all regions of a firmware 240 within a storage unit 200. Thereafter, the generated digital signature is stored in a specific region 250 within the storage unit 200.

Subsequently, a bootloader 220 having a public key respective to the private key performs an authentication procedure for the security of the corresponding firmware by reading the overall regions of the firmware 240 for each booting process and by comparing the read regions with the generated digital signature.

According to the first embodiment of the present invention, the bootloader 220 performs an authentication procedure each time the system is booted by reading the overall regions of the firmware 240, thereby being capable of performing a perfect and complete system security check against any intrusion attempts by a hacker. However, according to the first embodiment of the present invention, while performing the authentication procedure, since the bootloader 220 is required to read the overall regions of the firmware 240 in order to perform authentication, the authentication process is time-consuming (i.e., the authentication time is long). This eventually indicates that the booting time of the entire system becomes long as well. Therefore, in case the size of the firmware is large, if the authentication procedure is performed according to the first embodiment of the present invention, the authentication time increases, thereby prolonging the booting time of the entire system.

Second Embodiment

Figure 3:
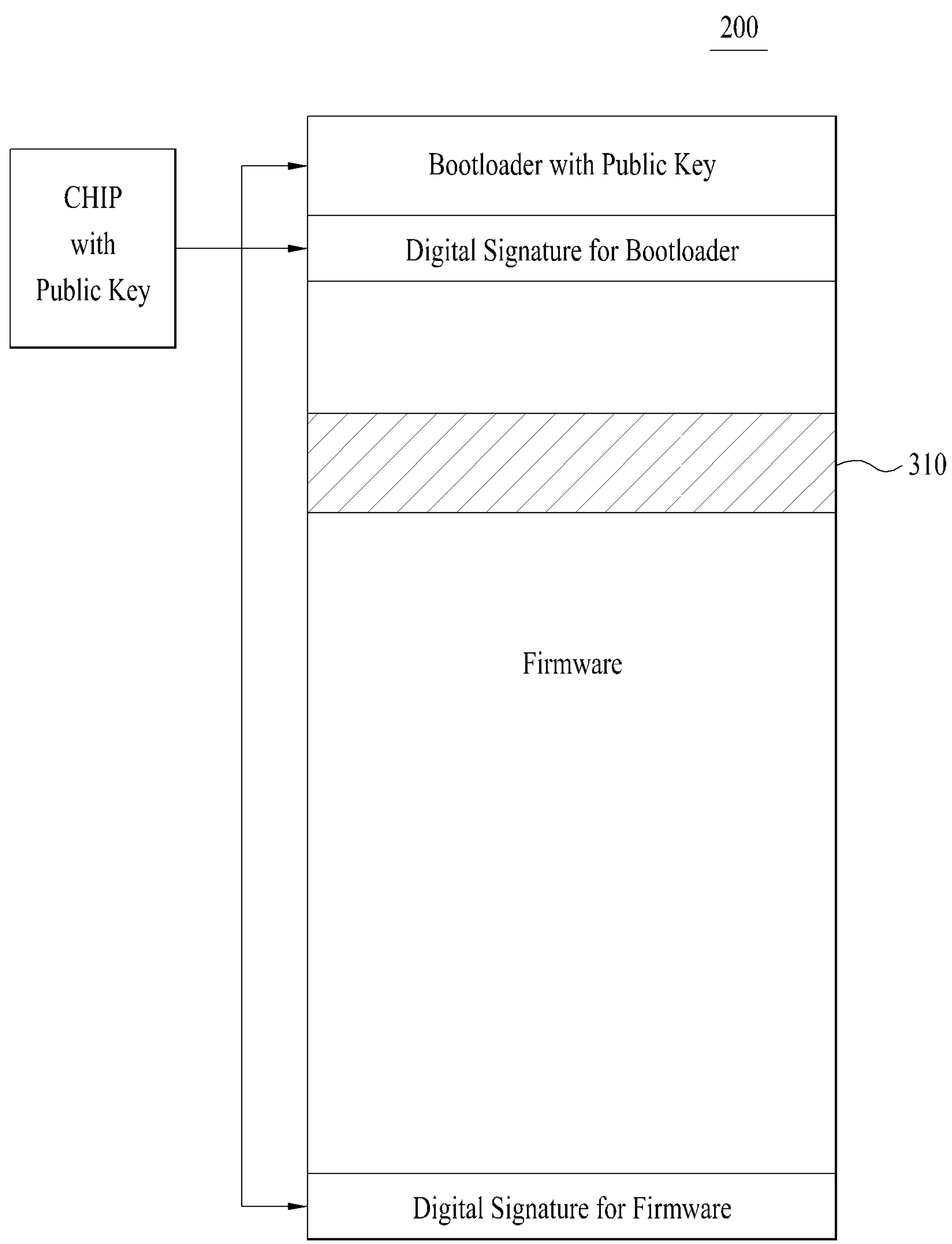
FIGS. 3 and 4 illustrate a secure booting method according to a second embodiment of the present invention.
Figure 4:
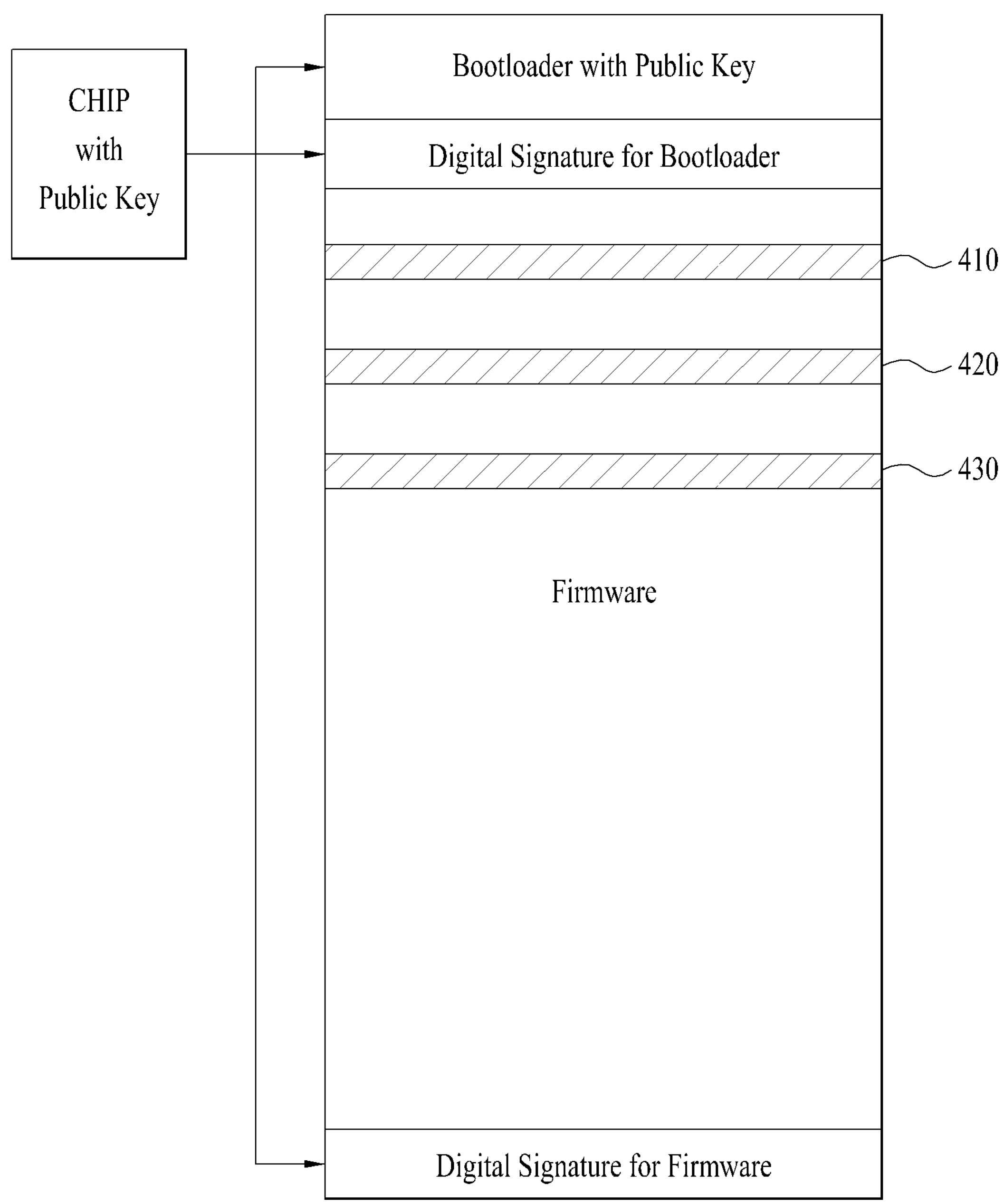

FIGS. 3 and 4 illustrate a secure booting method according to a second embodiment of the present invention.

Referring to FIGS. 3 and 4, according to the second embodiment of the present invention, unlike in the first embodiment of the present invention, wherein the bootloader 220 reads the overall regions of the firmware 240 when performing an authentication procedure each time the system is booted, only one or more specific regions (hereinafter referred to as one or more interleaved portions) within the firmware are read, so as to perform authentication for a single digital signature, which is generated with respect to the entire firmware or generated with respect to the specific region(s).

FIG. 3 shows an example wherein only one interleaved portion exists in within the firmware, and FIG. 4 shows an example wherein three interleaved portion exists in within the firmware.

Referring to FIG. 3, for example, one interleaved portion 310 is configured to have a size of 5MB in a region of a 15MB-sized offset position at the uppermost portion of the firmware 240.

Therefore, each time the system is booted, the bootloader 220 performs the authentication procedure by reading the region wherein only the interleaved portion 310 is located within the firmware 240, thereby covering for the authentication of the entire firmware 240.

In FIG. 4, first to third interleaved portions 410, 420, and 430 are respectively configured to have a size of 1MB in regions of 0MB, 10MB, and 20MB-sized offset positions with respect to the uppermost portion of the firmware 240.

Therefore, each time the system is booted, the bootloader 220 performs the authentication procedure by reading only the first to third interleaved portions 410, 420, and 430 within the firmware 240, thereby covering for the authentication of the entire firmware 240.

According to the second embodiment of the present invention described above with reference to FIGS. 3 and 4, the size, offset position, and number of each interleaved portion within the firmware are all decided while collectively taking into account the system performance, the targeted authentication time and/or the targeted security level, and so on, of all devices. And, therefore, the present invention will not be limited only to the example shown in the accompanying drawings.

Therefore, according to the second embodiment of the present invention, the booting time may be significantly reduced as compared to the method according to the first embodiment of the present invention. However, since the other regions that are not provided with the interleaved portions within the firmware 240 are more vulnerable to intrusion attempts of a hacker, the aspect of ensuring security against hacking attempts is less reliable and less secure as compared to the authentication method according to the first embodiment of the present invention.

Third Embodiment

Figure 5:
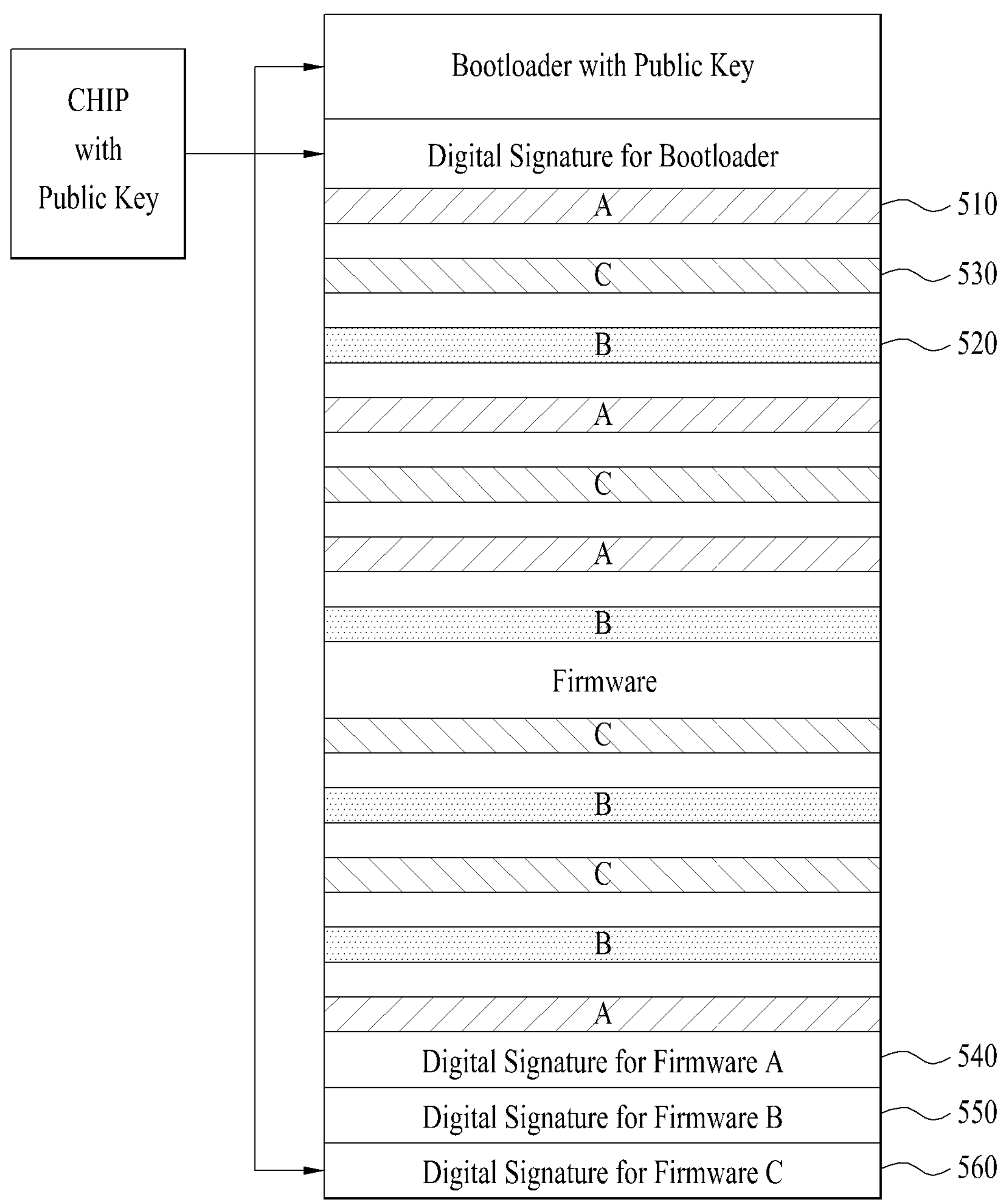
FIG. 5 illustrates a secure booting method according to a third embodiment of the present invention.
Figure 6:
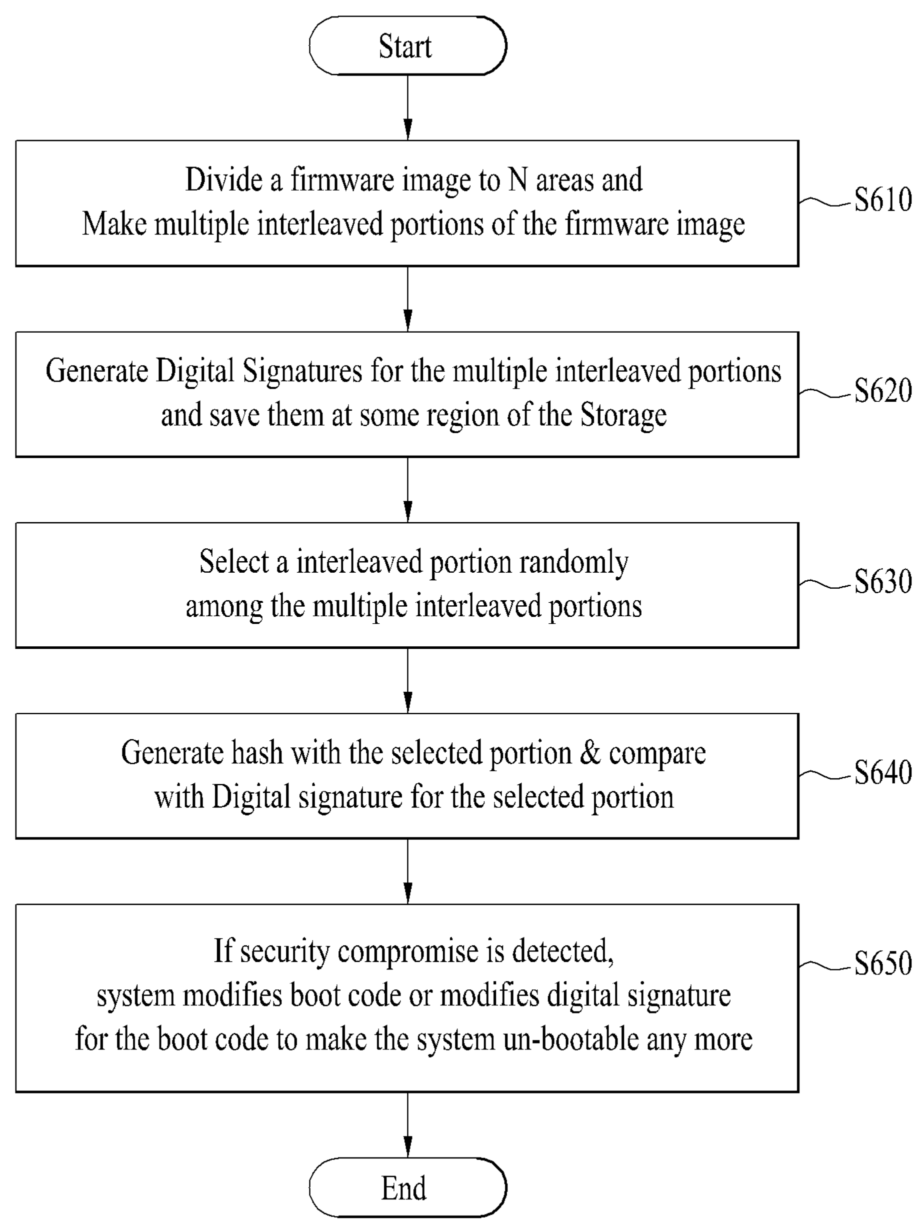
FIG. 6 illustrates a flow chart of a secure booting process shown in FIG. 5.

FIG. 5 illustrates a secure booting method according to a third embodiment of the present invention, and FIG. 6 illustrates a flow chart of a secure booting process shown in FIG. 5.

According to an embodiment of the present invention, a method of secure booting of a system in a digital broadcast receiver comprises aligning a plurality of interleaved portions to generate a digital signature, respectively, with an entire firmware image, generating a digital signature of each interleaved portion, selecting a specific interleaved portion, generating a first message digest to read a region of the selected interleaved portion in the entire firmware image and a second message digest from the digital signature of the selected interleaved portion and verifying the firmware image based on the first and second message digest and booting the system in the digital broadcast receiver.

As described above, the aspect of ensuring security against hacking attempts was more emphasized in the first embodiment of the present invention, and the aspect of the authentication time was more emphasized in the second embodiment of the present invention. However, the first embodiment and the second embodiment of the present invention may be considered to be insufficient for ensuring security while performing fast booting. Therefore, hereinafter, embodiments of the present invention that can satisfy both aspects will be described in detail.

Hereinafter, the third embodiment of the present invention shown in FIG. 5 will be described sequentially and in detail with reference to FIG. 6.

First of all, the entire firmware 240 is divided into N number of regions (or areas). Then, multiple interleaved portions (shown in FIG. 5 as interleaved portion A 510, interleaved portion B 520, and interleaved portion C 530) are generated, which are then adequately aligned in the N number of divided regions (S601). More specifically, interleaved portions A to C are adequately aligned in each of the N number of regions, which divides the entire firmware 240, in accordance with an alignment order decided by the system. For example, it is shown in FIG. 5 that the interleaved portions are aligned in the order of A-C-B-A-C-A-B-C-B-C-B-A for the N number of regions. However, this alignment order is merely exemplary, and, therefore, the present invention will not be limited only to the exemplary alignment order presented herein.

In the above-described process, in order to realize fast booting by setting the system so that all regions that are used in the current firmware 240 can be covered, and by checking and authenticating firmware security accordingly, the value N may be decided while taking into consideration the characteristics of the corresponding system. Furthermore, the value N may be varied later on depending upon the progress in the usage of the firmware, firmware upgrade, and so on.

Additionally, for example, the size of each region within the firmware 240, which is divided into N number of regions, may be identical to the size of the interleaved portion.

Moreover, referring to FIG. 5, although it is shown that an interleaved portion exists in every other region, among the N number of regions within the firmware, this is merely an example given to facilitate the understanding of the present invention. Accordingly, each of the interleaved portions may exist in each of the N number of regions, which is divided to cover the entire firmware. Furthermore, in case the firmware is divided into N number of regions while including unused regions, the gap (or space) in-between the interleaved portions may be understood as the unused regions within the entire firmware.

Subsequently, a digital signature is generated for each of the multiple interleaved portions adequately aligned in the N number of regions, and the generated digital signatures 540, 550, 560 are respectively stored in predetermined regions (S602). Herein, the number of the generated digital signatures corresponds to the number of multiple interleaved portions, which is different from the methods according to the first and second embodiments of the present invention. Referring to FIG. 5, interleaved portions A to C are adequately aligned in N number of regions, which covers the entire firmware 240. Herein, it can be known that a total of 3 digital signatures 540, 550, 560 respective to each of the interleaved portions A to C (a digital signature for regions within the firmware having the interleaved portion A positioned therein, a digital signature for regions within the firmware having the interleaved portion B positioned therein, and a digital signature for regions within the firmware having the interleaved portion C positioned therein) are generated and stored.

After step S602, each time the system is booted, the system selects an interleaved portion among the multiple interleaved portions (S603). Herein, the selection of the interleaved portion may be performed by using, for example, an equal probability selection method as a selection method for realizing true random selection. However, in relation with the above-mentioned selection, the present invention will not be limited only to the equal probability selection method. And, although a variety of other methods that can realize true random selection, which prevents selection from being made in accordance with a consistent pattern, so as to minimize damage and loss caused by hacking intrusions, can be used, since such methods use the disclosed techniques, detailed description of the same will be omitted for simplicity.

In step S602, a hash is generated for a region of the selected interleaved portion, and the generated hash is compared with the digital signature for the selected interleaved portion (S604). Herein, the hash is an algorithm and an example for a message digest.

Based upon the compared result of step S604, if a security compromise is detected, either the system is being intruded by a hacker, or the system is not fit for booting. Therefore, a boot code is corrected, or the digital signature for the boot code is corrected, so that the system booting procedure can no longer be continued (S605). However, in the opposite case (if a security compromise is not detected), the system completes the secure booting procedure.

Referring to FIGS. 5 and 6, according to the third embodiment of the present invention, security status for the entire firmware against hacking intrusions may be verified. Additionally, since the entire firmware is not required to be read, fast booting may be realized as well.

Furthermore, when applying the present invention to an actual system, a wide range of application schemes may be adopted depending upon the computing power of the system applying the present invention. For example, in a multi core or multi processor system, instead of one interleaved portion, multiple interleaved portions are selected, so as to perform authentication in parallel for each of the interleaved portions, thereby increasing the detection rate of a modulated code without increasing the authentication time. Alternatively, even if one interleaved portion is selected (e.g., if interleaved portion A is selected), the authentication procedure may be performed in parallel for each region aligned in the interleaved portion A (3 portions are included in the interleaved portion A shown in FIG. 5), thereby reducing the authentication time.

Fourth Embodiment

Figure 7:
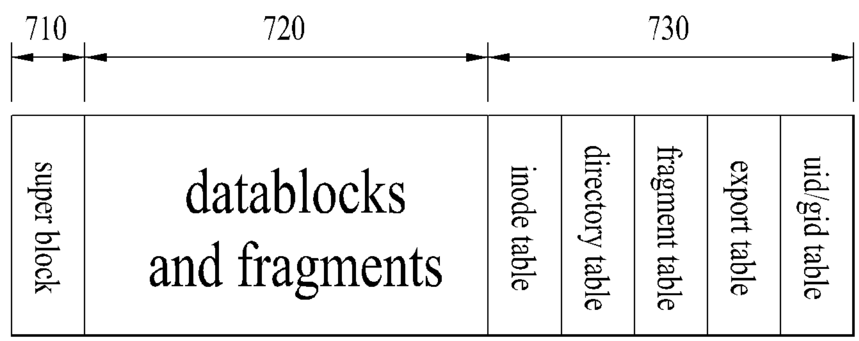
FIG. 7 illustrates an exemplary file system according to the present invention.
Figure 8:
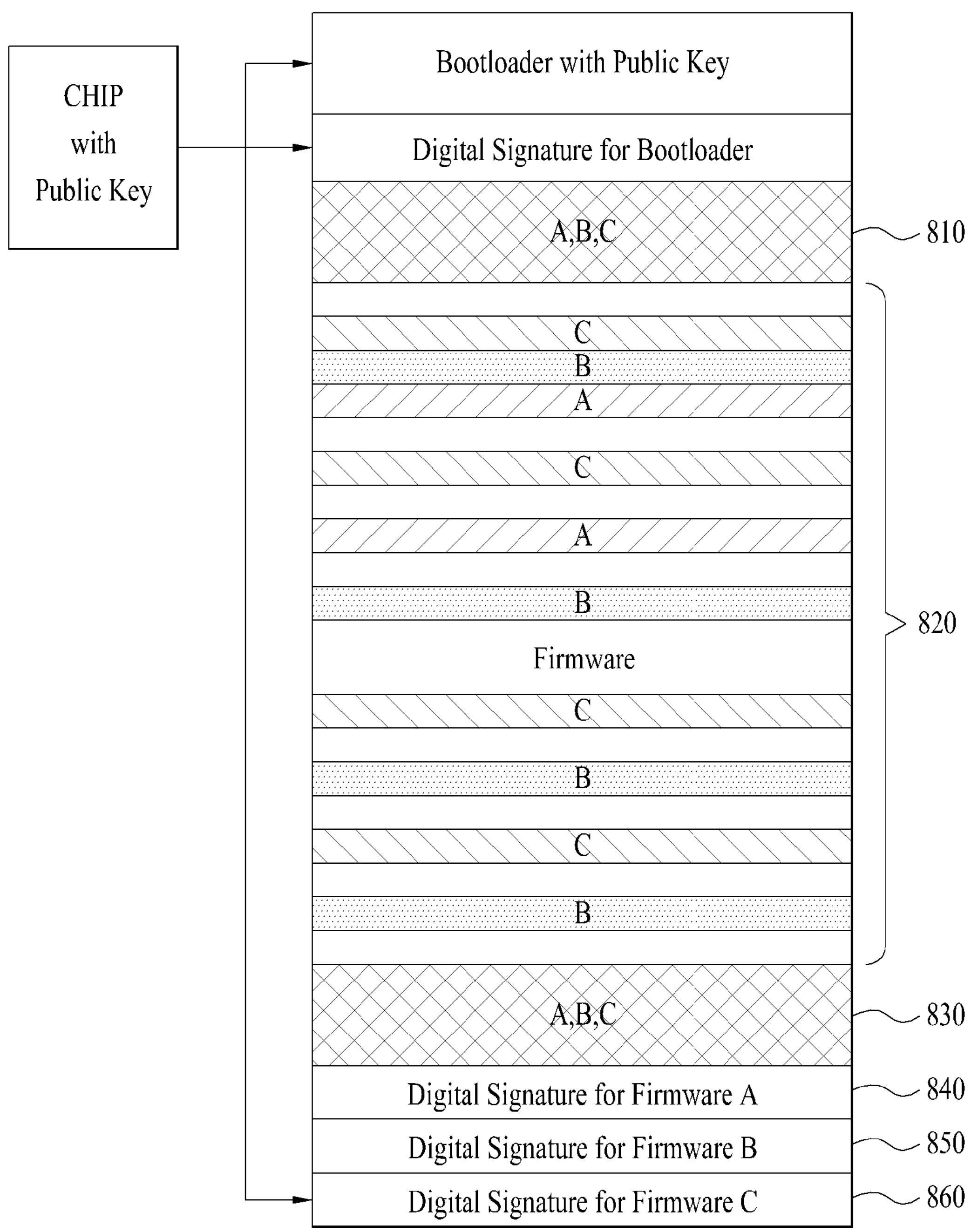
FIG. 8 illustrates a secure booting method using the characteristics of the file system shown in FIG. 7.

FIG. 7 illustrates an exemplary file system according to the present invention, and FIG. 8 illustrates a secure booting method using the characteristics of the file system shown in FIG. 7.

According to an embodiment of the present invention, a method of secure booting of a system in a digital broadcast receiver comprises dividing into a header part, a body part and a tailor part in an entire firmware image based on a file system, wherein the body part is aligned a plurality of interleaved portions to generate a digital signature, respectively, and the header and tailor part as a whole area includes all interleaved portions of the body part, generating a digital signature of each interleaved portion, selecting a specific interleaved portion, generating a first message digest to read any one of the header and tailor part in the entire firmware image and a second message digest from the digital signature of the selected interleaved portion and verifying the firmware image based on the first and second message digest and booting the system in the digital broadcast receiver. At this time, the header and tailor part is updated if any interleaved portion of the body part is modified.

According to the present invention, the device is equipped within a unique file system. FIG. 7 shows an exemplary layout of a Squash File System as an example of the unique file system for simplicity.

Referring to FIG. 7, the squash file system is configured by including a header part 710 referred to as a super block, a body part 720 including datablocks and fragments, and a tailor part 730 including an mode table, a directory table, a fragment table, an export table, and a uid/gid table.

Herein, essentially in the squash file system shown in FIG. 7, if any change occurs in the datablocks or fragments, the data of the header part 710 is modified or updated. More specifically, any change in the datablocks or fragments may be known by using the header part 710.

FIG. 8 seeks to refer to the characteristics of the squash file system shown in FIG. 7 and to use such characteristics in the secure booting method.

Referring to FIG. 8, as shown in the squash file system of FIG. 7, it can be known that the overall regions of the firmware 240 is divided into a super block region (hereinafter referred to as a header part) 810, a datablock region (hereinafter referred to as a body part) 820, and mode table, directory table, fragment table, export table, uid/gid table regions (hereinafter referred to as a tailor part) 830.

Herein, for example, as shown in the above-described third embodiment of the present invention, the entire body part 820 may be divided into N number of regions, and multiple interleaved portions (e.g., interleaved portions A, B, and C in FIG. 8) may be adequately aligned with respect to the entire body part 820, which is divided into N number of regions. FIG. 8 shows an example wherein the interleaved portions A, B, and C are sequentially aligned in the body part 820 in the order of C-B-A-C-A-B-C-B-C-B.

Conversely, the multiple interleaved portions are all included in the header part 810 and the tailor part 830. In FIG. 8, it can be known that interleaved portions A, B, and C are all included in the header part 810 and the tailor part 830.

Accordingly, when using the characteristics of the above-described squash file system, even if at least one interleaved portion is selected by a true random selection according to the third embodiment of the present invention, the header part 810 or the tailor part 830 is always included. And, even if only one region of the header part 810 or the tailor part 830 is authenticated, since information on any modification or change in the body part 820 is updated to the header part 810 or the tailor part 830, system security may be ensured while realizing fast booting. Therefore, in case a hacker directly intrudes and modulates the header part 810 or the tailor part 830, such intrusion and modulation may be immediately detected. And, even if the hacker intrudes and modulates a portion of the body part 820, since such information is reflected to at least one of the header part 810 and the tailor part 830, such intrusion and modulation may also be detected.

Therefore, according to the fourth embodiment of the present invention, any security compromise that may occur in the file system of the device may be effectively prevented.

Figure 9:
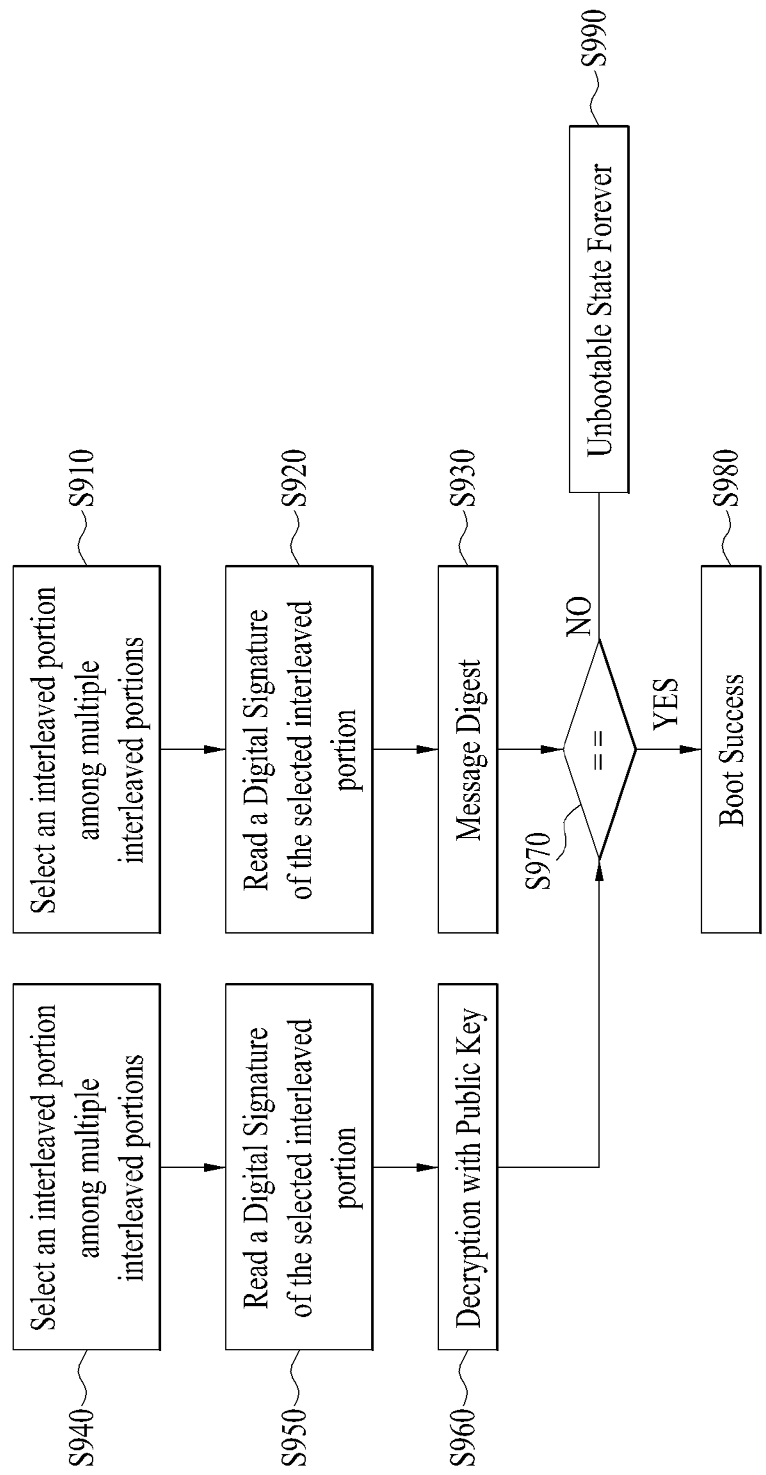
FIG. 9 illustrates a flow chart showing an exemplary operation flow of the secure booting method according to the present invention.

FIG. 9 illustrates a flow chart showing an exemplary operation flow of the secure booting method according to the present invention.

FIG. 9 uses a PKI (Public Key Infrastructure)-based algorithm as an electronic signature method, and, in an embedded environment, in order to reduce the calculation amount (time) of the PKI algorithm, a message digest algorithm is additionally used.

When the system is being booted, the CPU 122 of FIG. 1 performs the operation flow shown in FIG. 9. More specifically, each time the system is booted, the CPU 122 randomly selects an arbitrary interleaved portion among the multiple interleaved portions (S901) and, then, reads pre-defined sizes of the selected interleaved portion from each position within a storage unit 132 designated by the selected interleaved portion (S902), so as to load the read interleaved portion to the memory, thereby performing message digest (S903).

Additionally, the CPU 122 reads Digital Signature information corresponding to a selected interleaved portion (S904) from the Storage unit 132 (S905), so as to load the read Digital Signature information to the memory, and also reads Public Key information of the Bootloader 220 from the Storage unit, so as to load the read Public Key information to the memory. Thereafter, the read Digital Signature information is decrypted by using the read Public Key information of the Bootloader 220 (S906).

The CPU 122 compares a value outputted from the decryption process with a value outputted from the message digest process (S907). And, if the two values are equal to one another, the booting procedure is resumed (S908) (i.e., booting is successful). And, if the two values are different from one another, the booting procedure is stopped (S909). Furthermore, by using a method of deleting or modifying the boot code, or by using a method of deleting or modifying the Digital Signature for the boot code, booting of the system may be permanently disabled (i.e., the system may be permanently unbootable).

Hereinafter, a secure booting method for applications, which are divided into multiple partitions, will be described in detail.

Fifth and Sixth Embodiments

Figure 10:
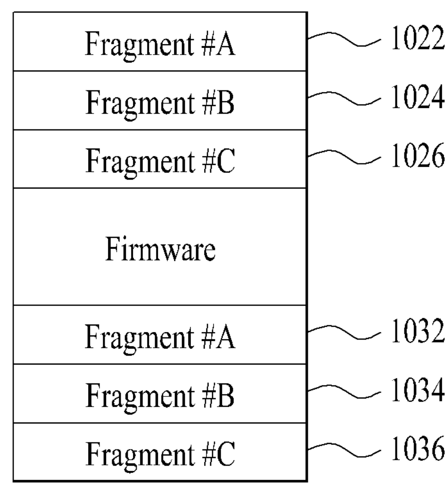
FIG. 10 illustrates an example of an entire firmware image being stored in a storage unit as a binary image according to the present invention.
Figure 11:
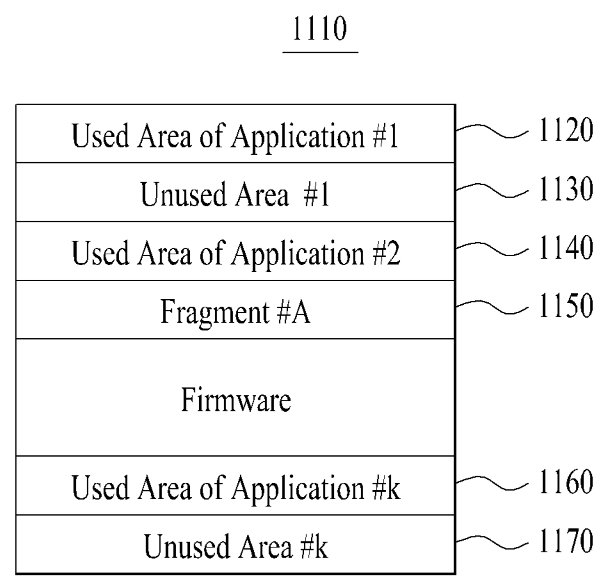
FIG. 11 illustrates an example of a plurality of applications, which are stored in the device, being classified as a plurality of partitions (a plurality of binaries) and stored in the storage unit according to the present invention.
Figure 12:
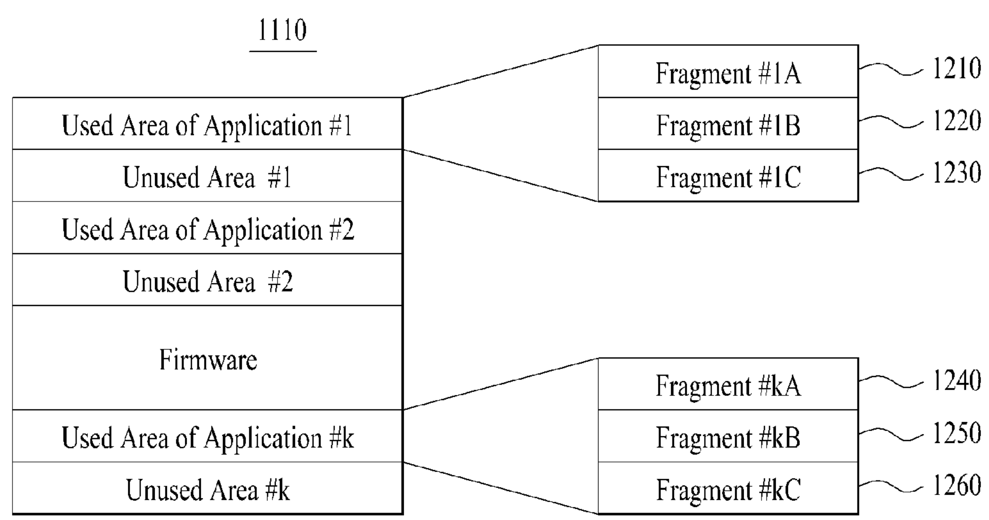
FIG. 12 illustrates an example of dividing fragments only for a Used Area of each partition according to the present invention.

FIG. 10 illustrates an example of an entire firmware image being stored in a storage unit as a binary image according to the present invention, FIG. 11 illustrates an example of a plurality of applications, which are stored in the device, being classified as a plurality of partitions (a plurality of binaries) and stored in the storage unit according to the present invention, and FIG. 12 illustrates an example of dividing fragments only for a Used Area of each partition according to the present invention.

According to the present invention, a method of secure booting of a system in a digital broadcast receiver comprises aligning a plurality of fragments to generate a digital signature, respectively, with each partition in an entire firmware image, wherein the partition is used to an application and is consisted of a different binary image, respectively, generating a digital signature of each fragment, selecting a specific fragment, generating a first message digest to read an area of the selected fragment in each partition and a second message digest from the digital signature of the selected fragment and verifying the firmware image based on the first and second message digest and booting the system in the digital broadcast receiver.

Applications that are stored in a storage unit of the may be configured as a single partition and used and, whenever required, the applications may also be divided into a plurality of partitions and used.

In this case, FIG. 10 and FIG. 11 may be collectively used.

In FIG. 10, for example, the entire applications are configured as a single binary image, which may correspond to an efficient structure for continuously storing the corresponding binary image without being interrupted by unused areas, when the binary image is being stored in the storage unit. Also, for instances, a plurality of fragments (Fragment #A 1022, Fragment #B 1024, Fragment #C 1026) correspond to the interleaved portion in FIG. 5 are aligned with the storage unit. Accordingly, the verification is processed as similarly FIG. 2.

FIG. 11, for example, is efficient for a case wherein multiple applications are configured as binary images each different from one another, thereby being divided into multiple partitions and stored within the storage unit.

Conversely, FIG. 12 corresponds to a method of using the method of FIG. 10 in a structure shown in FIG. 11, wherein only the used area (or regions) of each partition are divided into multiple fragments.

Therefore, as shown in FIG. 12, in case of applications divided into multiple partitions 1120, 1140, 1160, the method of FIG. 5 is applied only for the Used Area of each partition. Thus, the entire firmware is read so that the entire firmware can be authenticated without having to load the read information to the memory.

Referring to FIG. 12, for example, K number of areas (or regions) used by the applications within the entire firmware region, i.e., partitions exist. And, each partition may be identified by using N number of fragments 1210, 1220 and 1230 or 1240, 1250 and 1260.

Herein, the system may be able to know a start offset and used size of each partition during a Running Time of the system, and N is a pre-fixed value. At this point, the fragment that is to be read uses the start offset and N value information so as to be capable of reading the required (or necessary) parts.

Thus, the unused area shown in FIGS. 11 and 12 are not required to be read and loaded to the memory, and the Digital Signature for the unused area is not required to be calculated. More specifically, the Authentication process for the unused area may be omitted. Accordingly, the authentication time for the entire firmware may be reduced, and, by preventing the value N from excessively increasing, an optimal N value may be set up, thereby further enhancing the efficiency of the authentication process.

Figure 13:
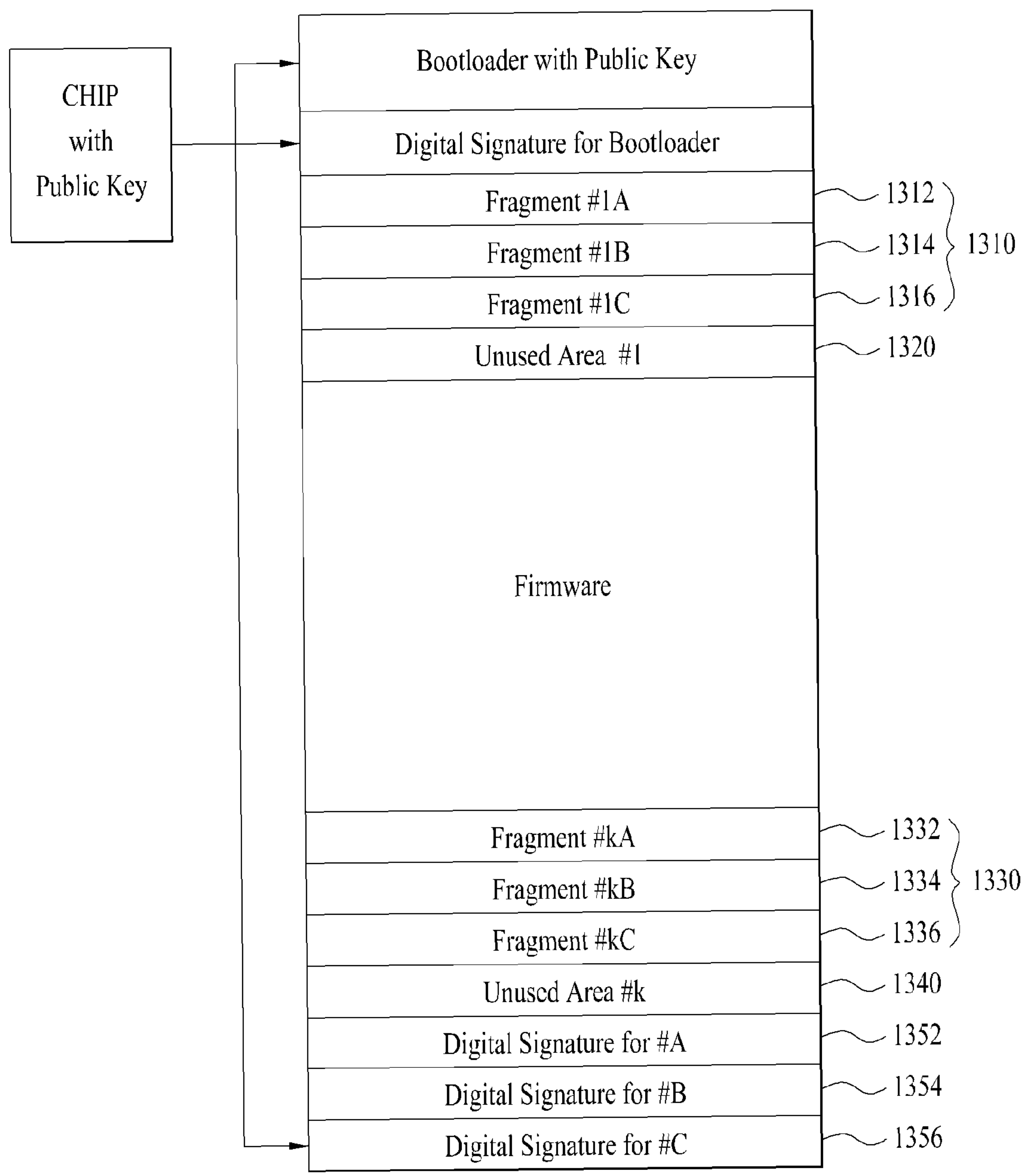
FIG. 13 illustrates a secure booting method according to a fifth embodiment of the present invention.

FIG. 13 illustrates a secure booting method according to a fifth embodiment of the present invention.

FIG. 13 illustrates an example of a firmware having the method of FIG. 12 applied thereto.

Referring to FIG. 13, M number of unused areas 1320, 1340 and k number of partitions of used areas 1310, 1330 used by the applications exist within the entire firmware. Herein, in each partition, for example, N number of fragments is aligned so as to cover the entire region of the corresponding partition. At this point, the number of fragments N may either be the same in each partition, or may be different from one another depending upon the size of each partition. Also, the fragments 1312, 1314 and 1316 or 1332, 1334 and 1336 may either have the same alignment order in all of the partitions, or the fragments may have a different alignment order for each partition.

Furthermore, in FIG. 13, a digital signature 1352, 1354 and 1356 is generated with respect to each of the n number of fragments and then stored.

In other words, when at least one or more fragments are selected from N number of fragments, instead of reading all of the fragments of each partition within the firmware, by reading only the area (or region) wherein the at least one of more selected fragments are aligned, the secure booting method according to the fifth embodiment of the present invention may ensure secure booting while reducing a significant amount of authentication time.

Figure 14:
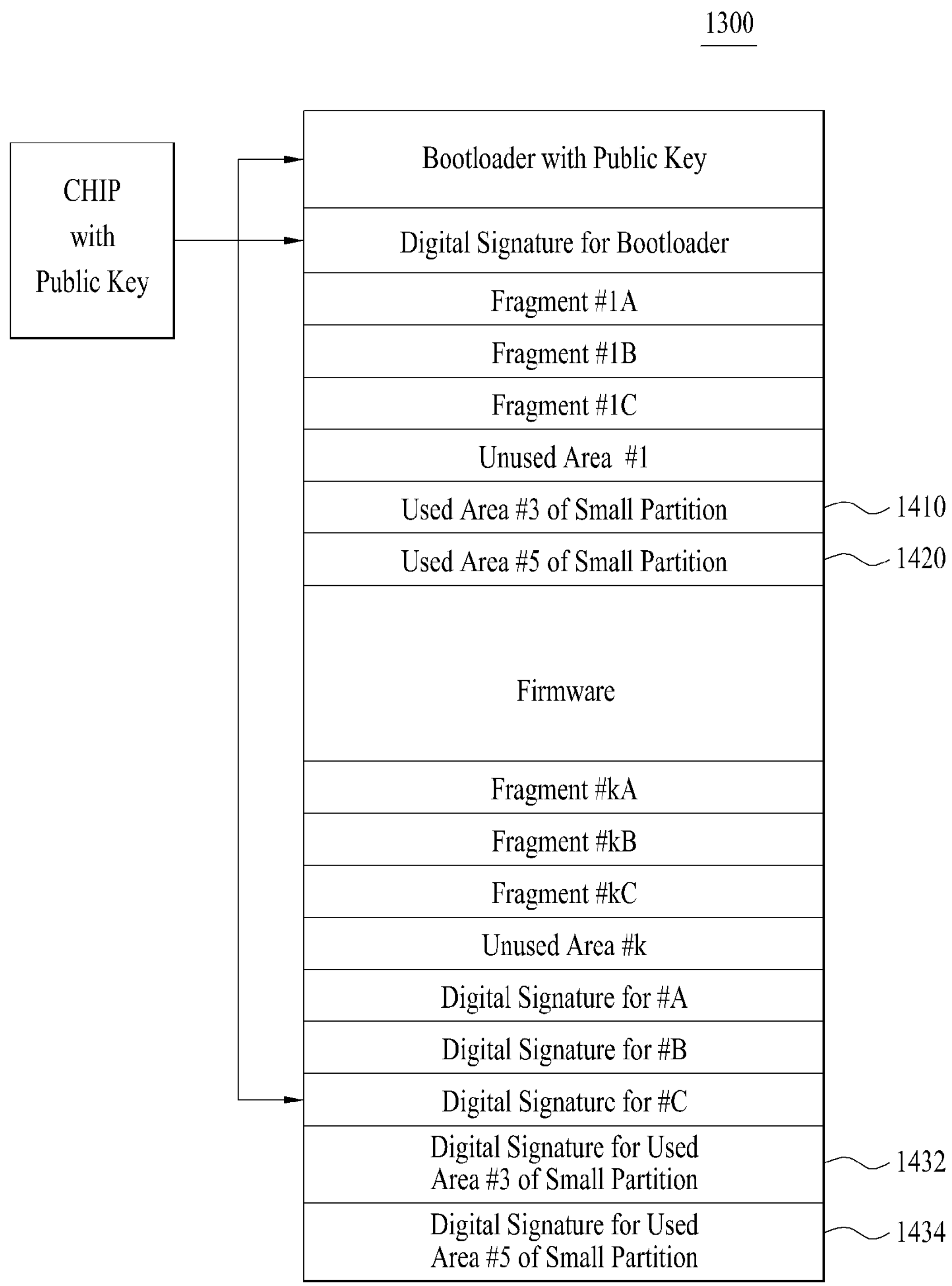
FIG. 14 illustrates a secure booting method according to a sixth embodiment of the present invention.

FIG. 14 illustrates a secure booting method according to a sixth embodiment of the present invention.

The sixth embodiment of the present invention is similar to the above-described fifth embodiment of the present invention. Therefore, reference will be made to the identical parts, or the direct citations will be made on the common parts. Therefore, only the different parts will be described in the following description.

For example, all of the partitions that are used by the applications within the firmware are not required to be divided into N number of fragments. Referring to FIG. 14, in case of partitions 3 and 5 (small partitions) 1410, 1420, which are used by applications, since the size of each partition is small, the entire portion of the corresponding partitions may be read and authenticated. Furthermore, in case of the small partitions, a digital signature 1432, 1434 may be individually generated for each small partition, or a single digital signature may be generated for a plurality of small partitions. In case of such small partitions, the size of a small partition and the authentication process for the small partition are decided based upon a standard pre-decided by the system. And, default settings may be made on the small partitions decided as described above, so that the entire region (or area) of the corresponding small partitions is read and authenticated.

Seventh and Eighth Embodiments

Figure 15:
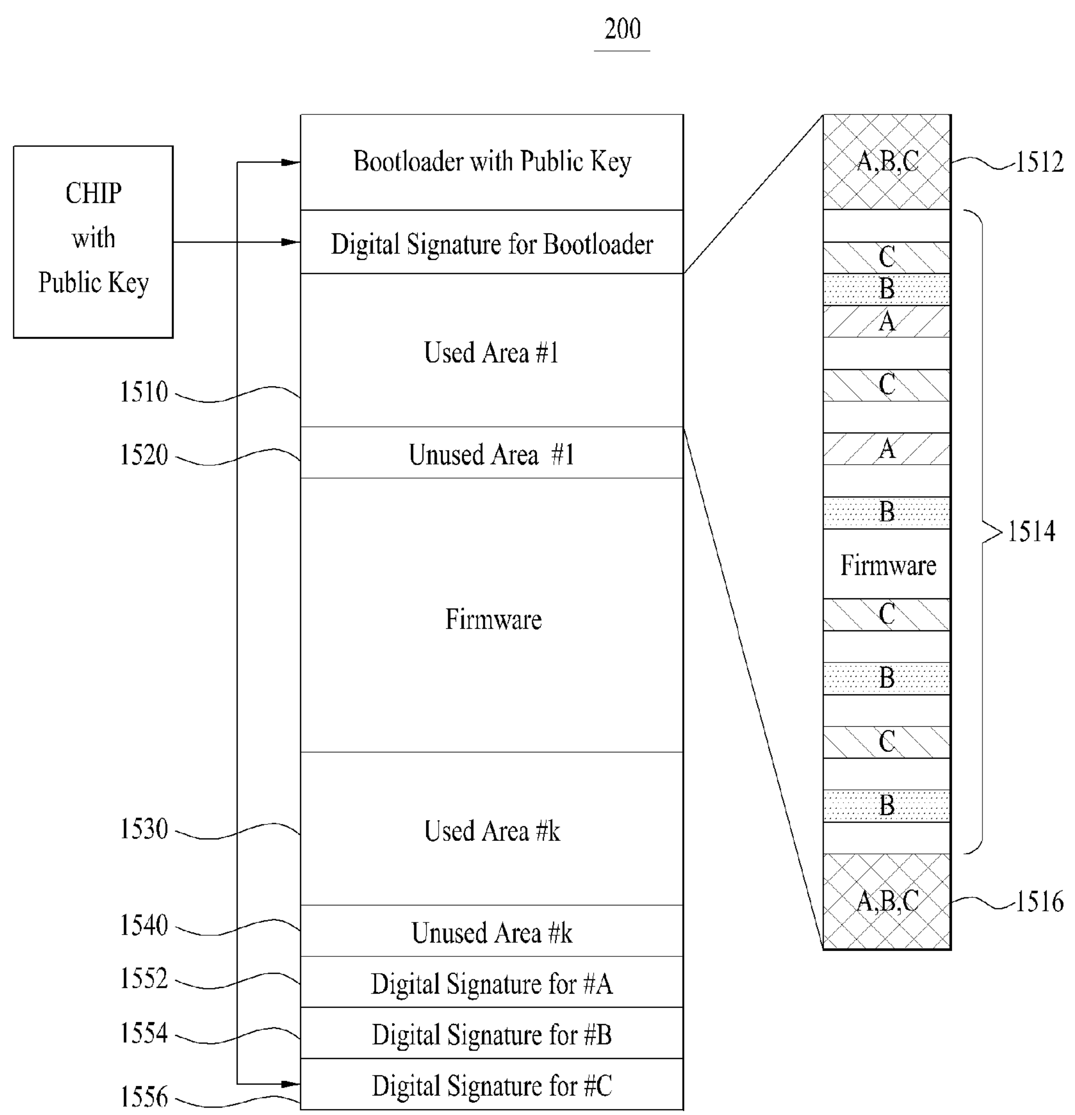
FIG. 15 illustrates a secure booting method according to a seventh embodiment of the present invention.
Figure 16:
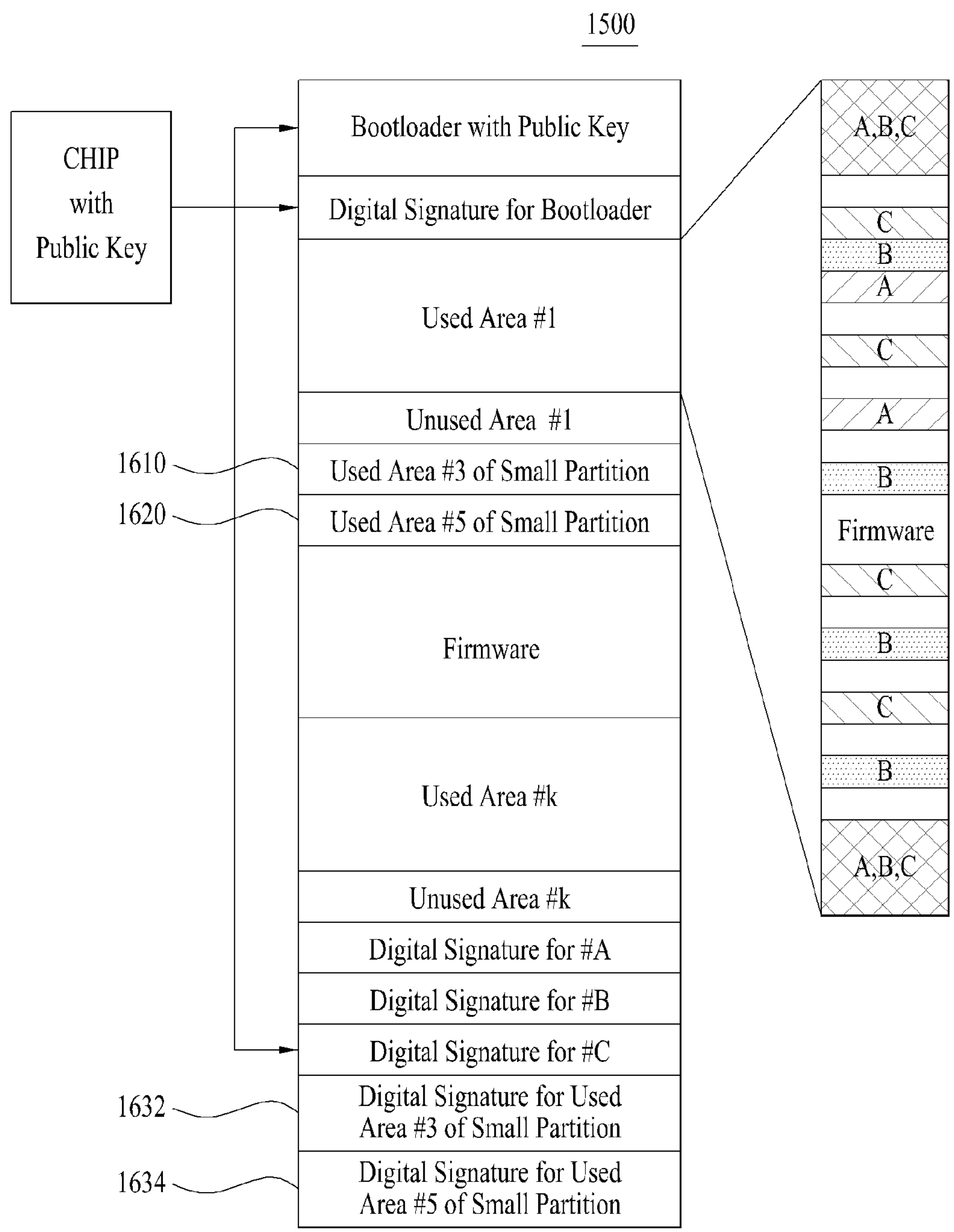
FIG. 16 illustrates a secure booting method according to an eighth embodiment of the present invention.

FIG. 15 illustrates a secure booting method according to a seventh embodiment of the present invention, and FIG. 16 illustrates a secure booting method according to an eighth embodiment of the present invention.

According to the present invention, a method of secure booting of a system in a digital broadcast receiver comprises aligning a plurality of fragments to generate a digital signature, respectively, with a first partition and a second partition to be verified a whole area in an entire firmware image, wherein each first partition is used to an application and is consisted of a different binary image, respectively, generating a digital signature of each fragment and the second partition, selecting a specific fragment, generating a first message digest to read an area of the selected fragment in the first partition and the second partition, and a second message digest from the digital signature of the selected fragment and the second partition and verifying the firmware image based on the first and second message digest and booting the system in the digital broadcast receiver.

Herein, the secure booting method according to the seventh embodiment of the present invention shown in FIG. 15 corresponds to a combined concept of the fourth and fifth embodiments of the present invention, and the secure booting method according to the eighth embodiment of the present invention shown in FIG. 16 corresponds to a combined concept of the fourth and sixth embodiments of the present invention.

The seventh embodiment of the present invention will now be described with reference to FIG. 15. In the seventh embodiment of the present invention, the firmware is divided into a plurality of partitions 1510 and 1520, as described in the fifth embodiment of the present invention. And, unlike in the fifth embodiment of the present invention, when each partition uses multiple fragments 1512, 1514 and 1516, the concept of the squash file system is used, as described in the fourth embodiment of the present invention.

The eighth embodiment of the present invention will now be described with reference to FIG. 16. In the eighth embodiment of the present invention, the firmware is divided into a plurality of partitions, including small partitions 1610 and 1620, as described in the sixth embodiment of the present invention. Herein, the entire area of each small partition is read and authenticated, and the concept of the squash file system is used in the remaining partitions, as described in the fourth embodiment of the present invention.

For example, when multiple fragments are used in a specific partition, unlike in the above-described fifth and sixth embodiments of the present invention, the squash file system is divided into a header part, a body part, and a tailor part, and the squash file system may be configured so that all of the fragments are included in the header part and the tailor part. Accordingly, by reading only the header and tailor parts and by loading the read header and tailor parts to the memory, security may be ensured for the authentication of the entire region of the corresponding partition, and the authentication time may be reduced significantly.

Furthermore, although it is not shown, considering the size of each partition, the concept of the squash file system is applied in a specific partition, as described in the fourth embodiment of the present invention, and secure booting may be performed by using multiple partitions on the entire region of the corresponding partition, as described in the third embodiment of the present invention. This may be applied in the system after deciding an efficient structure of the system based upon the security issue and authentication time for the corresponding system. Moreover, in case of the squash file system of FIG. 7, when hacking attempts are being made on each datablock, only the corresponding block may be affected by the hacking attempts. However, since firmware images are essentially compressed in the squash file system, in case the corresponding block is affected by the hacking attempts, the compressed files, i.e., the size and offset of the datablock may be modified. Accordingly, such modifications are evidently reflected to the header part or the tailor part, thereby enabling the system to detect any modulation on the respective firmware image.

Figure 17:
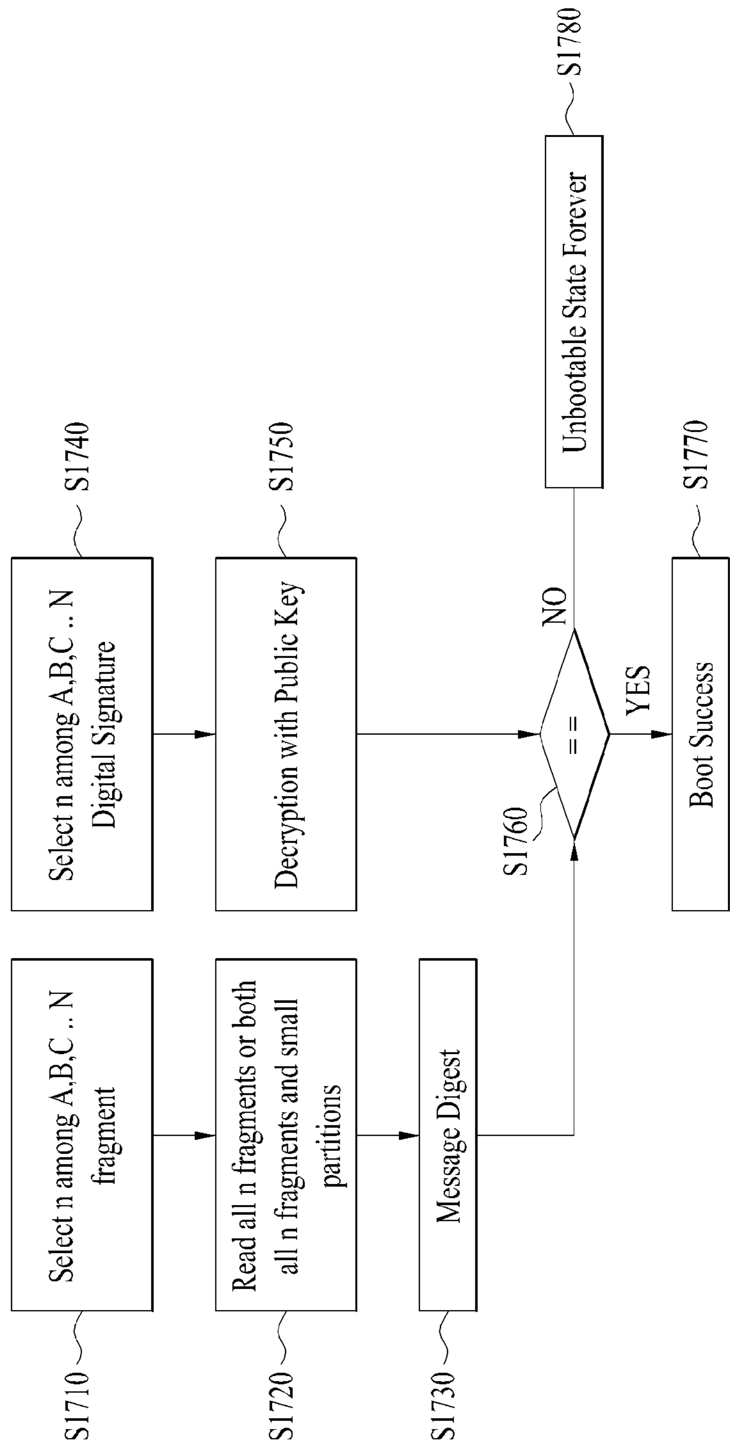
FIG. 17 illustrates a flow chart showing another exemplary operation flow of the secure booting method according to the present invention.

FIG. 17 illustrates a flow chart showing another exemplary operation flow of the secure booting method according to the present invention.

FIG. 17 is nearly identical to the above-described operation flow shown in FIG. 9.

When the system is being booted, the CPU 122 of FIG. 1 performs the operation flow shown in FIG. 17. More specifically, each time the system is booted, the CPU 122 randomly selects at least one fragment from a plurality of fragments (S1701) and, then, reads the selected fragment from each partition (S1702), so as to load the read fragment to the memory, thereby performing message digest (S1703).

Additionally, the CPU 122 reads Digital Signature information corresponding to the selected fragment (S1704) from the Storage unit, so as to load the read Digital Signature information to the memory, and also reads Public Key information of the Bootloader 220 from the Storage unit, so as so as to load the read Public Key information to the memory. Thereafter, the read Digital Signature information is decrypted by using the read Public Key information of the Bootloader 220 (S1705).

The CPU 122 compares a value outputted from the decryption process with a value outputted from the message digest process (S1706). And, if the two values are equal to one another, the booting procedure is resumed (S1707) (i.e., booting is successful). And, if the two values are different from one another, the booting procedure is stopped (S1708). Furthermore, by using a method of deleting or modifying the boot code, or by using a method of deleting or modifying the Digital Signature for the boot code, booting of the system may be permanently disabled (i.e., system may be permanently unbootable).

The above-described operation flows shown in FIG. 6 or FIG. 9 or FIG. 17 may be performed only once, or, when tighter security is required depending upon the security level, the same operation flow may be repeatedly performed, or the above-described operation flow may be repeatedly performed on other interleaved portions or fragments, thereby ensuring a higher level of security.

Each of the above-described embodiments of the present invention is applied in the system shown in FIG. 1. Among the devices including a CPU 122 (herein, the CPU includes all of a secure processor, a micro processor, and a security-specific chip 210 realizing a security function with an HW), a memory, and a storage unit (storage units including HDD or flash memory), each embodiment of the present invention may be applied to any type of system that seeks to adopt the secure booting method in order to protect the data within the storage unit from any external hacking intrusions on the data within the storage unit, wherein the hacking intrusions include data modulation on the data within the storage unit. Most particularly, the secure booting method is effective when applied in a system, which requires fast verification for a secure booting process of a firmware.

As described above, according to each embodiment of the present invention, the authentication time may be minimized while ensuring a maximum level of security of the system during the booting process. And, by reducing the booting time, user convenience may be enhanced, and the system may be capable of responding more quickly to the user's requests. Additionally, the efficiency of the entire system may be enhanced while maintaining backward compatibility with the conventional system. Furthermore, in addition to secure booting, the method according to the present invention may be applied in diverse fields that require ensured security and reduced authentication time.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of secure booting of a system in a digital broadcast receiver, the method comprising:

aligning a plurality of interleaved portions to generate a digital signature, respectively, with an entire firmware image;

generating a digital signature of each interleaved portion;

selecting a specific interleaved portion;

generating a first message digest to read a region of the selected interleaved portion in the entire firmware image and a second message digest from the digital signature of the selected interleaved portion; and verifying the firmware image based on the first and second message digest and booting the system in the digital broadcast receiver, wherein the plurality of interleaved portions are aligned to the entire firmware image except for an area which is unused by an application.

2. The method of claim 1, wherein the selected interleave portion is randomly selected according to an equal probability method every booting the system.

3. The method of claim 1, further comprises verifying a boot loader to authenticate the firmware image at a chip having a public key.

4. The method of claim 1, wherein the first message digest is generated using a hash algorithm.

5. A method of secure booting of a system in a digital broadcast receiver, the method comprising:

dividing into a header part, a body part and a tailor part in an entire firmware image based on a file system, wherein the body part is aligned a plurality of interleaved portions to generate a digital signature, respectively, and the header and tailor part as a whole area includes all interleaved portions of the body part;

generating a digital signature of each interleaved portion;

selecting a specific interleaved portion;

generating a first message digest to read any one of the header and tailor part in the entire firmware image and a second message digest from the digital signature of the selected interleaved portion; and verifying the firmware image based on the first and second message digest and booting the system in the digital broadcast receiver, wherein the header part includes all digital signatures which are generated to the aligned plurality of interleaved portions within the body part.

6. The method of claim 5, wherein the file system includes a squash file system.

7. The method of claim 5, wherein the header and tailor part is updated if any interleaved portion of the body part is modified.

8. The method of claim 5, wherein the selected interleave portion is randomly selected according to an equal probability method every booting the system.

9. The method of claim 5, further comprises verifying a boot loader to authenticate the firmware image at a chip having a public key.

10. The method of claim 5, wherein the first message digest is generated using a hash algorithm.

11. A digital broadcast receiver of secure booting of a system, the digital broadcast receiver comprising:

a receiver to receive a content;

a decoder to decode the content;

a controller to control to align a plurality of interleaved portions to generate a digital signature, respectively, with an entire firmware image, and generate a digital signature of each interleaved portion; and an output unit to output the decoded content, wherein the controller controls to select a specific interleaved portion, generate a first message digest to read one or more regions of the selected interleaved portion in the entire firmware image and a second message digest from the digital signature of the selected interleaved portion, and verify the firmware image based on the first and second message digest and boot the system in the digital broadcast receiver, wherein the controller further controls to exclude an area which is unused by an application from the entire firmware image so as to align the plurality of interleaved portions.

12. The digital broadcast receiver of claim 11, wherein the controller controls to be randomly select the specific interleaved portion according to an equal probability method every booting the system.

13. The digital broadcast receiver of claim 11, further comprises verifying a boot loader to authenticate the firmware image at a chip having a public key.

14. The digital broadcast receiver of claim 11, wherein the first message digest is generated using a hash algorithm.

15. A digital broadcast receiver of secure booting of a system, the digital broadcast receiver comprising:

a receiver to receive a content:

a decoder to decode the content;

a controller to control to divide into a header part, a body part and a tailor part in an entire firmware image based on a file system, wherein the body part is aligned a plurality of interleaved portions to generate a digital signature, respectively, and the header and tailor part as a whole area includes all interleaved portions of the body part, and generate a digital signature of each interleaved portion; and an output unit to output the decoded content, wherein the controller controls to select a specific interleaved portion, generate a first message digest to read any one of the header and tailor part in the entire firmware image and a second message digest from the digital signature of the selected interleaved portion, and verify the firmware image based on the first and second message digest and boot the system in the digital broadcast receiver, wherein the controller further controls to include the header part including all digital signatures which are generated to the aligned plurality of interleaved portions within the body part.

16. The digital broadcast receiver of claim 15, wherein the file system includes a squash file system.

17. The digital broadcast receiver of claim 15, wherein the header and tailor part is updated if any interleaved portion of the body part is modified.

18. The digital broadcast receiver of claim 15, wherein the controller randomly selects the specific interleaved portion according to an equal probability method every booting the system.

19. The digital broadcast receiver of claim 15, wherein the controller further controls to verify a boot loader to authenticate the firmware image at a chip having a public key.

20. The digital broadcast receiver of claim 15, wherein the controller controls to generate the first message digest using a hash algorithm.

* * * * *